B. M. DES JARDINS.
MULTIPLICATION MACHINE.
APPLICATION FILED JAN. 29, 1916.

1,325,625.

Patented Dec. 23, 1919.
7 SHEETS—SHEET 1.

WITNESSES:
Andrew A. Johnson
F.C. Alexander

INVENTOR:
Benjamin M. DesJardins
BY
B.C. Stickney
ATTORNEY.

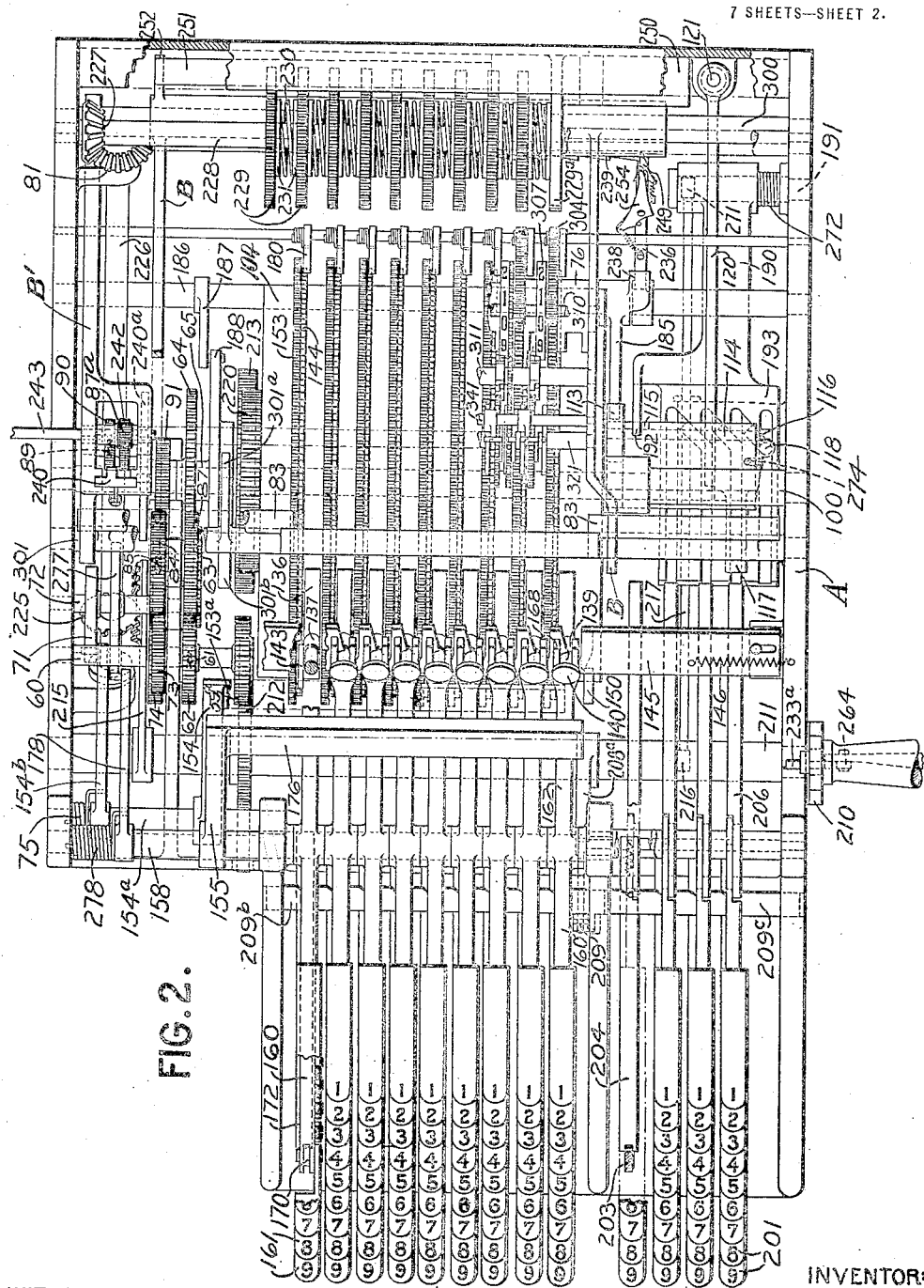

B. M. DES JARDINS.
MULTIPLICATION MACHINE.
APPLICATION FILED JAN. 29, 1916.

1,325,625.

Patented Dec. 23, 1919.
7 SHEETS—SHEET 3.

WITNESSES:
Arthur A. Johnson
F. E. Alexander

INVENTOR:
Benjamin M. Des Jardins
BY B. C. Stickney
ATTORNEY.

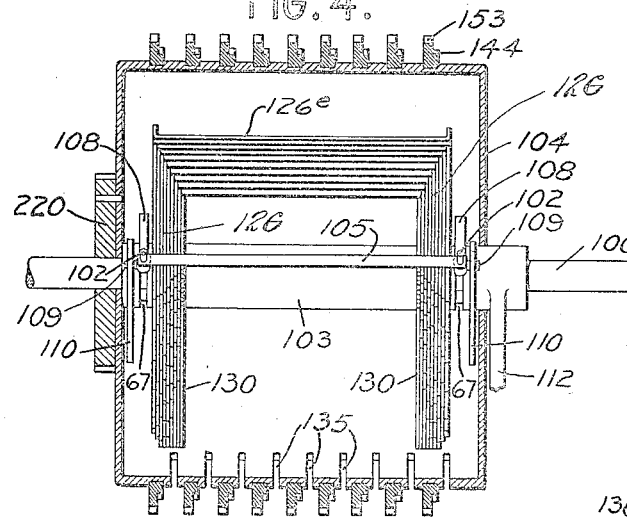
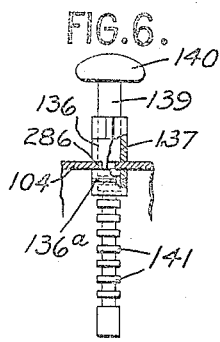
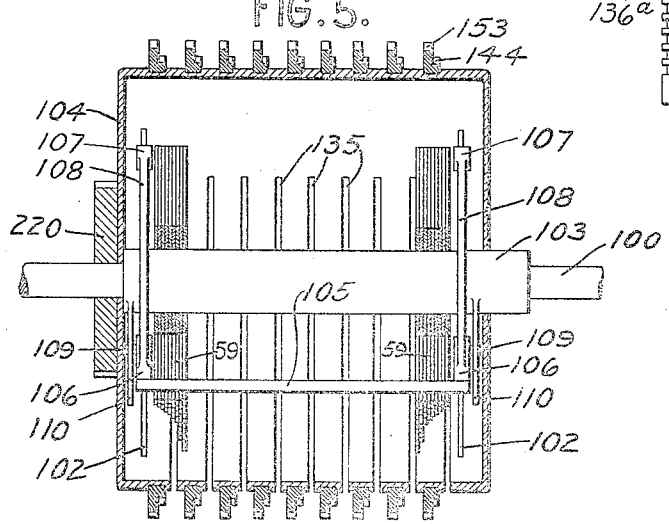

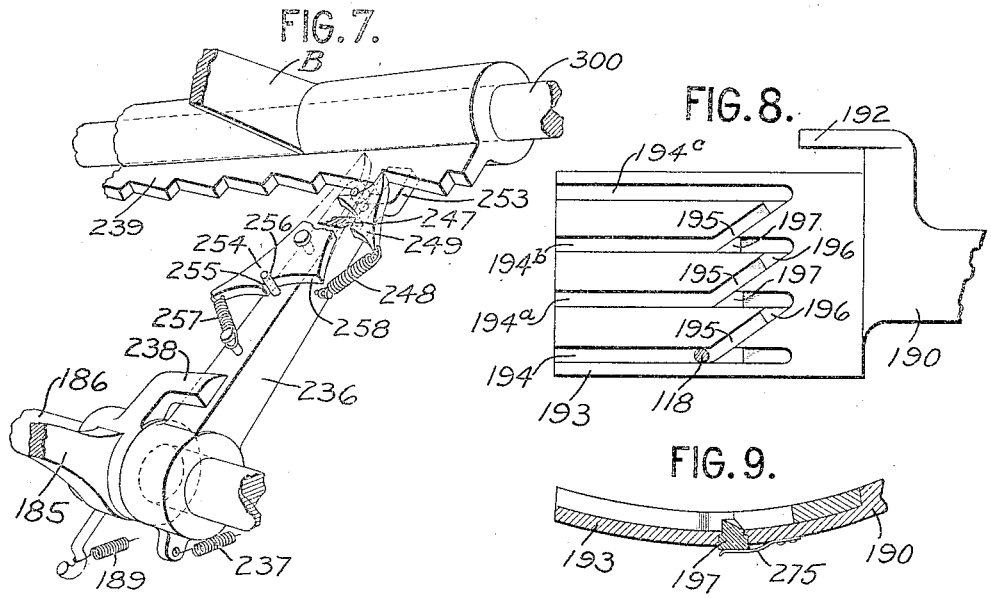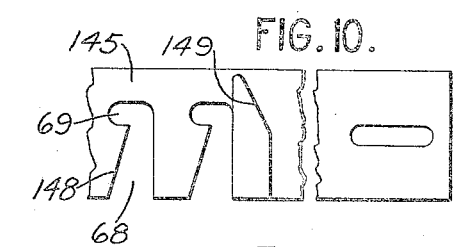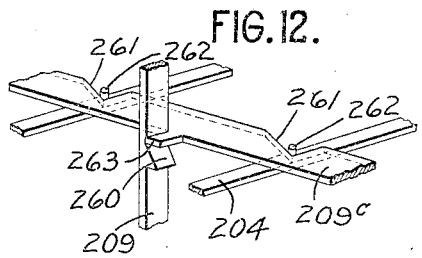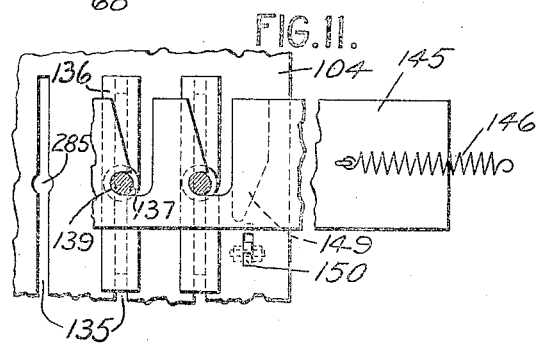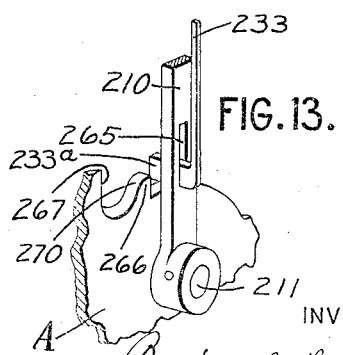

B. M. DES JARDINS.
MULTIPLICATION MACHINE.
APPLICATION FILED JAN. 29, 1916.
1,325,625.
Patented Dec. 23, 1919.
7 SHEETS—SHEET 6.
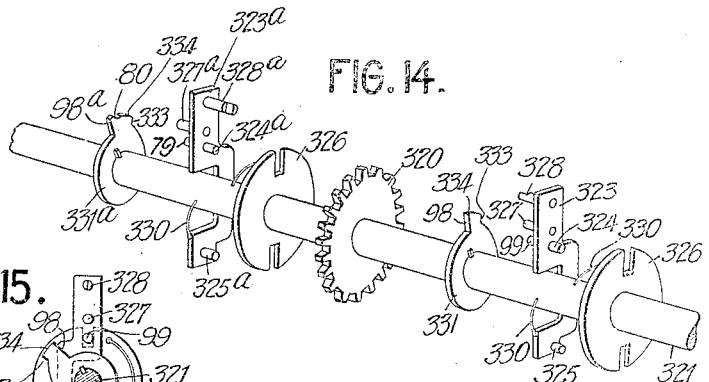
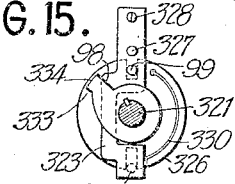
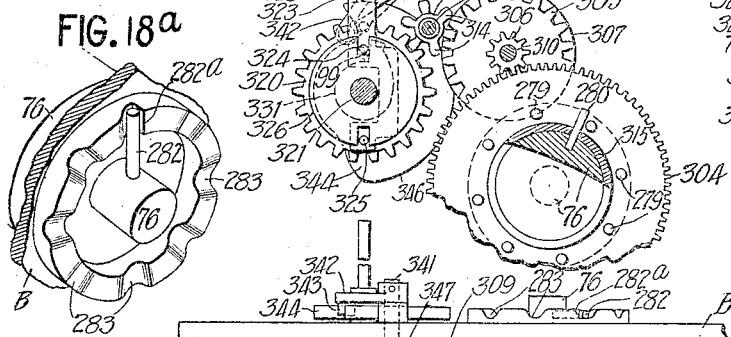
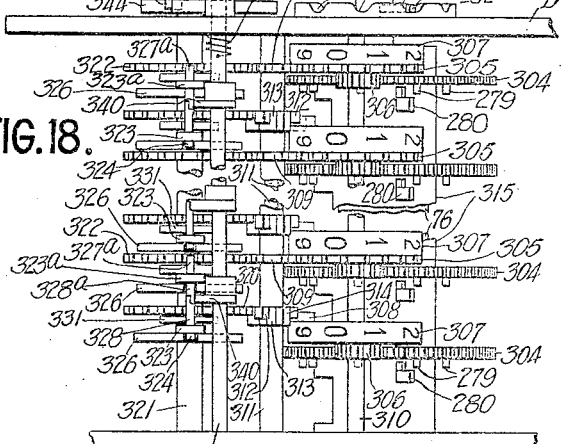
WITNESSES:
Arthur A. Johnson
F. E. Alexander
INVENTOR:
Benjamin M. Des Jardins
BY D. C. Stickney
ATTORNEY.

B. M. DES JARDINS.
MULTIPLICATION MACHINE.
APPLICATION FILED JAN. 29, 1916.
1,325,625.
Patented Dec. 23, 1919.
7 SHEETS—SHEET 7.
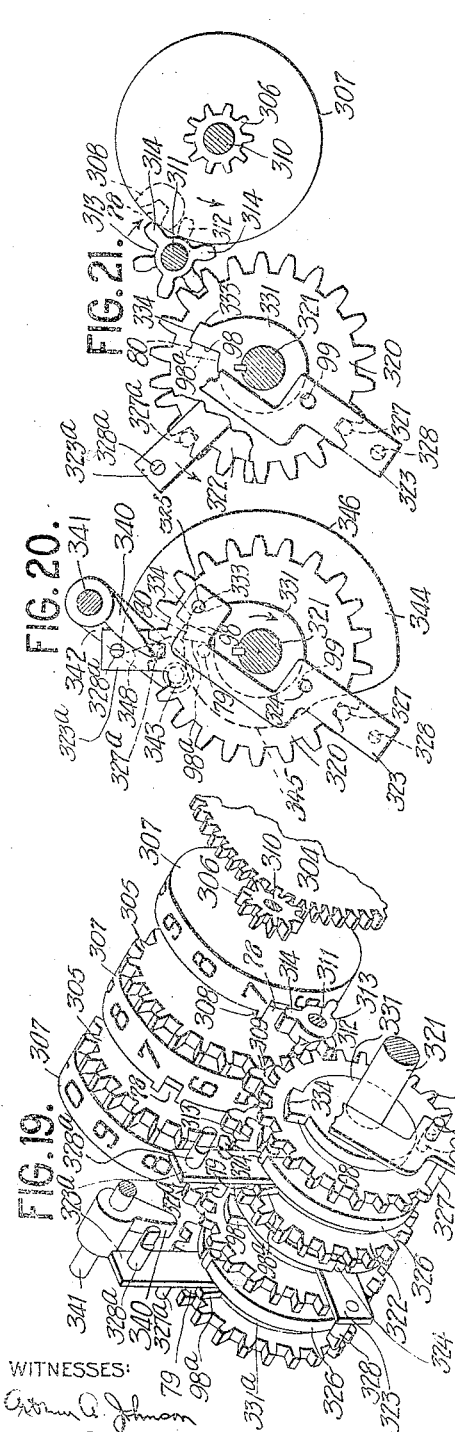
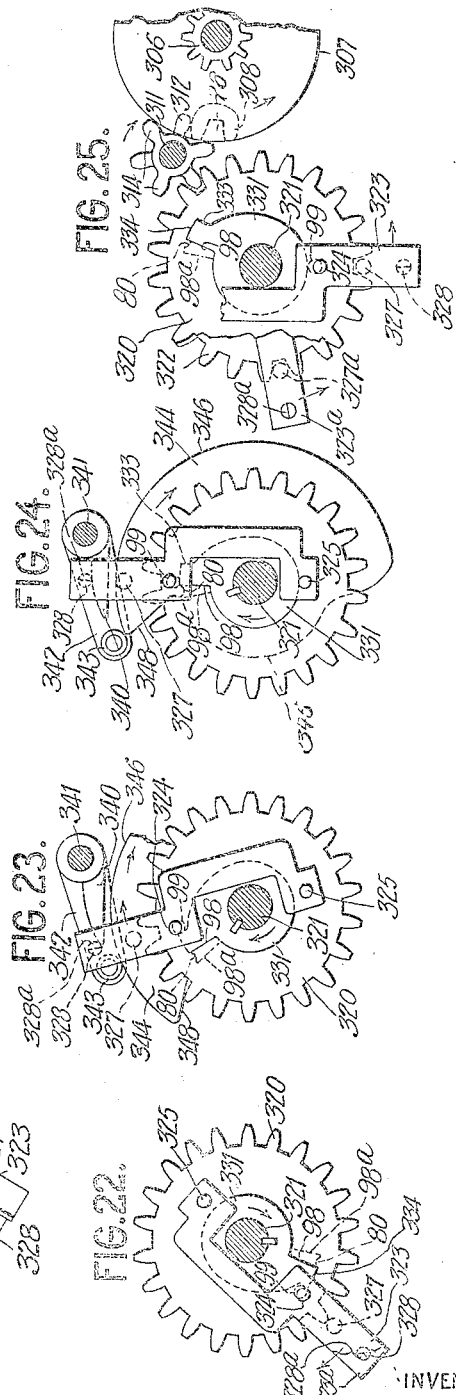

UNITED STATES PATENT OFFICE.

BENJAMIN M. DES JARDINS, OF WEST HARTFORD, CONNECTICUT, ASSIGNOR, BY MESNE ASSIGNMENTS, OF ONE-HALF TO UNDERWOOD COMPUTING MACHINE COMPANY, OF NEW YORK, N. Y., A CORPORATION OF NEW YORK.

MULTIPLICATION-MACHINE.

1,325,625.     Specification of Letters Patent.     Patented Dec. 23, 1919.

Application filed January 29, 1916. Serial No. 74,971.

*To all whom it may concern:*

Be it known that I, BENJAMIN M. DES JARDINS, a citizen of the United States, residing in West Hartford, in the county of Hartford and State of Connecticut, have invented certain new and useful Improvements in Multiplication-Machines, of which the following is a specification.

This invention relates to computing machines, and particularly to a machine adapted to the performance of addition and multiplication, and is a continuation, in part, of my prior application Serial No. 619,182, filed April 4, 1911, the subject-matter of which is embodied herein, and said prior application, No. 619,182 is substantially a duplicate of my still earlier application, Serial No. 546,195, filed February 26, 1910.

For the purpose of performing multiplication, the machine is provided with two keyboards of compact construction, one keyboard to be used to index the multiplicand on the machine, and the other keyboard to be used to index the multiplier on the machine. In the present embodiment, the capacity of the multiplicand keyboard is nine denominations, and the capacity of the multiplier keyboard is four denominations, but the capacity of the machine is not limited to the present embodiment but may be increased or diminished by increasing or diminishing the number of associated parts coöperating with the keys of the respective keyboards.

All of the numeral keys of the same denomination, in the multiplicand keyboard, are mounted on a lever, and one such lever is provided for each denomination. Each of said levers is adapted to be swung, at each operation, through an angle corresponding to the value of the particular numeral key depressed, and to move therewith, an associated multiplicand index pin, the direction of motion of said pin being parallel to its axis, and the extent of movement corresponding with the angular movement of said levers. On depressing any key, therefore, the lever by which it is carried will be moved and the associated index pin will be set to index or set up on the machine a corresponding digit of the multiplicand. The multiplier numeral keys are likewise mounted on levers similar to the multiplicand key levers, and are adapted to actuate sector plates or gages having a series of stepped stops formed thereon corresponding to the values of the numeral keys depressed; said stops, in coöperation with intervening mechanism, serving to limit angular movement of the multiplicand index pins to varying extents corresponding to the several partial products which would result from the multiplication severally of the digits of the multiplicand by the value of the digit of the multiplier in a denomination in which computation is taking place.

In order to effect a reading of the product, in accordance with the indexing of the multiplicand and multiplier, the machine is provided with a totalizer mounted on a carriage, which is adapted to move step by step in denominational direction relative to the computing mechanism.

In order that the partial products may be run into the totalizer according to the indexing of the multiplicand and multiplier on the machine, there is provided a general operator handle, the reciprocation of which will swing a gear segment into mesh with a train of gearing and cause a universal stop bar to be moved to an extent corresponding to the value of each digit, one at a time, in the multiplier, beginning with the digit of the lowest denomination, and so on to the digit of highest denomination. To effect the multiplication of any number by a multiplier of two or more digits the handle will be reciprocated a number of times equal to the number of denominations in the multiplier, to register the partial products in the totalizer. During the initial part of the actuation of the general operator handle, said universal stop bar is moved into the path of stops carried by sectors arranged in pairs, there being one pair for each digit from "1" to "9," each pair being connected by a bail so positioned as to lie in the path of the multiplicand index pins. Said sectors determine the extent of angular motion of the multiplicand index pins, and may be termed the product sectors.

The product sectors or gages and the universal multiplier stop bar actuating mechanism therefor are concentrically mounted within a cylindrical drum mounted on the framework of the machine, said drum being provided with slots, one for each denomination in the multiplicand keyboard, and extending partially around the periphery of the drum. In each slot of the drum is mounted a slide carrying a multiplicand index pin, all of which pins are held in their normal positions by a universal releasing bar extending across the machine to engage all the multiplicand index pins; said slides being also held in their normal position by the levers of the multiplicand keyboard when said levers are in their normal zero position.

During the initial working stroke of the general operator handle, the cylindrical drum is oscillated by a gear segment of the general operator through the intermediary of gear wheels, and said drum carries therewith, by friction, the multiplicand index pin slides corresponding to the set pins, after said slides have been released as a result of the coöperative engagement of a finger on the drum and a cam member on the universal releasing bar, above-mentioned. Each of the released index pins engages a bail of one of the product sectors, the particular bail engaged by a particular pin being dependent upon the setting of the respective pin, to rotate said product sector until one of the stops thereon engages the universal multiplier stop bar. The position of the stop bar determines the particular stop of the product sector which will engage therewith, and the relative position of that stop on said sector determines the extent of its rotation and thereby the extent of rotation of the corresponding index pin and its slide. After all the slides have been stopped any further rotation of the cylindrical drum in the same direction will be idle.

On the cylindrical drum is concentrically and slidably mounted one annular rack and one annular ratchet for each denomination in the multiplicand keyboard, said ratchets and racks being held against rotation during that rotation of the drum which effects the setting up of the product sectors and index pins. During the succeeding rotation of the drum in the other direction, the multiplicand pin-bearing slides will be driven back to their normal positions and said slides are provided with pawls adapted to engage said ratchets and racks to rotate the latter therewith during their return motion and to thereby rotate wheels of the totalizer, in mesh with said racks through corresponding angular distances. The totalizer is provided with a carry-over mechanism on which carry-over actions are initiated during the rotation of the totalizer wheels through the intermediary of said annular racks, the tens-carrying action to be completed as a result of a subsequent operation. During the latter part of the actuation of the general operator in return direction, the totalizer will be swung out of mesh with the annular racks and into mesh with a set of frictionally driven gear wheels adapted to complete the carry-over action, said gears being driven through the intermediary of friction disks and bevel gearing, from a gear segment carried by the general operator.

After the first reciprocation of the general operator to register the partial product corresponding to the multiplication of the multiplicand by the digit of units order in the multiplier, the universal multiplier-stop-bar mechanism is, on the initial part of the first stroke of the next reciprocation, brought into register with the indexing mechanism corresponding to tens place of the multiplier, so that said universal stop bar may be moved an extent corresponding to the digit of tens order in the multiplier, and thereby so limiting the motion of the product sector plates, during the second reciprocation of the general operator that the index pins and their slides will be moved angular distances proportional to the partial products corresponding to the multiplication severally of the digit of the multiplicand multiplied by the digit of tens order in the multiplier; the totalizer having been moved one step denominationally so that the wheels of its tens order will be in mesh with the annular rack of units order on the cylindrical drum, the wheels of higher order being correspondingly shifted with respect to the racks on the drum.

The proper timing of the action of the various parts of the machine is controlled by cams actuated through the intermediary of gearing driven by the gear sector which drives the cylindrical drum, there being provided cams and levers also actuated by the general operator to re-set the parts to their normal position, the general operator handle being adapted to move in excess of its reciprocating motion at the will of the operative for this purpose. The totalizer carriage, however, is restored to its normal position by hand.

A feature of the invention is the keyboards of compact construction, directly connected to the indexing mechanism on which may be indexed the entire value of the multiplicand and the multiplier prior to the actuation of any other parts of the machine.

Another feature of the invention is that the partial products are first set up on the product mechanism and subsequently run into the totalizer simultaneously in the various denominations, during which no carry-over action takes place from a lower to a higher denomination, the extent of carry-over being predetermined in the totalizer, the wheels of which are subsequently rotated to the required extent by mechanism other than the product mechanism.

Another feature of the invention is that all the rotating parts of the product mechanism, the totalizer, and carry-over mechanism being frictionally driven, they themselves being loose and unimpeded, insures that said parts will be moved to their full extent since the driving mechanisms move in excess of the extreme limit of the motion required by the registering mechanisms of the machine.

Another feature of the invention is that overthrow of the moving parts is impossible, there being provided mechanism to positively arrest the parts at the end of their motion.

Another feature of this invention is that a carry-over action may be initiated from a lower to a higher denomination during the completion of a carry-over action previously initiated on the totalizer by the product mechanism.

Another feature of the invention is that the parts of the machine need only be moved through one cycle for each denomination in the multiplier, to register the product, whereas, heretofore, in machines of this type, it has been necessary to actuate the mechanism a number of times directly proportional to the digital value of each digit of the multiplier.

Other features and advantages will hereinafter appear.

In the accompanying drawings,

Fig. 2 is a general plan view of the machine, with parts omitted to show the underlying structure.

Fig. 3 is a side view of the machine looking in the opposite direction to that in Fig. 1, parts being broken away to show the underlying structure.

Figure 1:
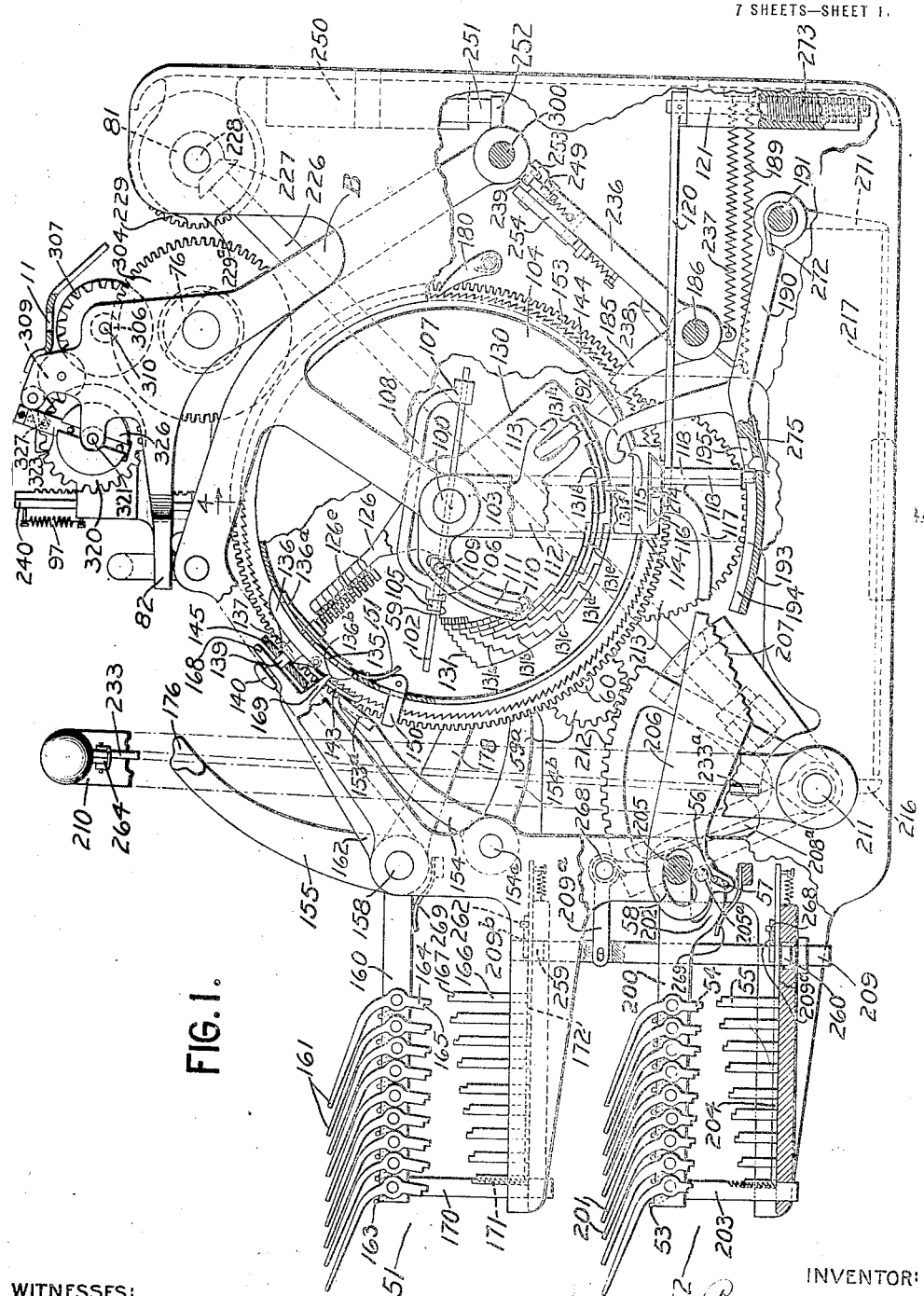
Figure 1 is a side elevation of the machine, with parts omitted and parts broken away to show the underlying structure.

Fig. 3ª is a diagrammatic view of parts of the mechanism illustrated in Fig. 3, in the position to which they are moved during a resetting operation.

Fig. 4 is a detail view in section on the line 4—4 of Fig. 1 of the cylindrical drum and contained mechanism looking from front to rear.

Fig. 5 is a horizontal sectional view through the drum shown in Fig. 4.

Fig. 6 is a sectional detail of a multiplicand index pin and its associated slide.

Fig. 7 is a fragmentary view and perspective of the totalizer carriage escapement mechanism.

Fig. 8 is a detail plan view of the guide plate of the escapement mechanism for the parts which co-act with the multiplier indexing mechanism.

Fig. 9 is a sectional view of Fig. 8.

Fig. 10 is a fractional detail view of the multiplicand index-releasing bar, looking from the bottom up.

Fig. 11 is a fractional plan view of the bar shown in Fig. 10, showing some of the multiplicand index pins in section, and part of the cylindrical drum on which they are mounted.

Fig. 12 is a fractional view in perspective, showing part of the numeral key-releasing mechanism.

Fig. 13 is a fractional view in perspective, showing the general operator handle and the latch, carried thereby, which is actuated when the handle is to be moved to restore parts of the computing mechanism to their normal position.

Fig. 14 is a fractional view in perspective of parts of the carry-over mechanism, showing the parts distended.

Fig. 15 is a detail view of a portion of the carry-over devices of the totalizer, viewed from the opposite direction from that shown in Fig. 14.

Fig. 16 is a front view of the parts shown in Fig. 14, in their normal position.

Fig. 17 is a fractional detail side view, showing one of the trains of gearing of the totalizer and a portion of the carry-over devices.

Fig. 18 is a fractional plan view of the totalizer, zero-setting mechanism and a portion of the totalizer carriage.

Fig. 18ª is a perspective view of a portion of the totalizer framework showing the cam surfaces for the zero-setting device.

Fig. 19 is a perspective view of a portion of the totalizer, showing the position of the parts after a carry-over action has been initiated.

Fig. 20 is a diagrammatic side view of a portion of the carry-over mechanism, showing the parts in position at the initial part of the motion during which a carry-over action is completed.

Fig. 21 is a diagrammatic side view, showing a portion of the totalizer and carry-over mechanism during the completion of a carry-over action.

Fig. 22 is a side view similar to Fig. 20, showing the parts after the completion of a carry-over action and during the initial part of their return motion to normal position.

Fig. 23 is a side view similar to Fig. 20, showing the parts near the end of their return stroke to normal position.

Fig. 24 is a side view similar to Fig. 23, showing the parts very near the end of their return motion to normal position.

Fig. 25 is a side view similar to Fig. 21, showing the position of the parts when a carry-over action is initiated to a wheel of higher denomination during the time that a carry-over action is completed onto said wheel from a wheel of lower denomination.

In order to index on the machine the value of the multiplicand and the multiplier, the machine is provided with keyboards 51 and 52 respectively, each of which is connected with its indexing mechanism.

In order to index the value of the multiplicand on the machine, the keyboard 51 is provided with numeral keys, 161, there being provided nine numeral keys, ranging in value from "1" to "9", for each denomination throughout the denominational capacity of the keyboard 51. Each of the numeral keys from "1" to "9", corresponding to the same denominational order of the multiplicand keyboard, is connected, through the intermediary of a lever common to all, to an index pin, there being one such pin, lever and set of keys, for each denominational order of the keyboard. On depressing a key of any denominational order, the index pin of corresponding order will be moved in a direction parallel to its axis, the extent of movement being proportional to the value of the numeral key depressed, as will presently be described. By depressing the numeral key of each order corresponding to the multiplicand digit of corresponding order, the index pins will be set in a manner dependent upon the value of the multiplicand.

All of the numeral keys of a denomination, Figs. 1 and 2, are pivoted to the forward end of a key lever 160, which is loosely pivoted on a shaft 158 and has a rearward extension 162, which carries, at its end, a fork 168, adapted to normally pass under a head 140, with which the multiplicand index pin 139 (Fig. 1) is provided at its upper end; there being one index pin for each denomination in the multiplicand keyboard 51. The numeral keys 161 are yieldingly held in their normal positions by springs 163.

In order to move the key levers 160, 162 amounts corresponding to the values of the numeral keys depressed, each numeral key 161 is provided with a downwardly extending stop projection 164, which is adapted, when its key is depressed, to be moved into engaging relation with a stop 166 (Fig. 1) fast on the framework of the machine; each of said stops 164 being provided with a shoulder 165 to engage a shoulder 167 on the corresponding stop 166, to limit the downward motion of the forward arm 160 of the numeral key lever depressed. During the depression of the arm 160 of the numeral key lever, its rearward extension 162 is swung upwardly moving therewith its associated index pin 139 an extent corresponding to the numeral key depressed.

In order that the numeral key levers may be swung and stopped at a point corresponding to the value of the numeral key depressed, the stops 166 are graded, so that the numeral key will be swung through a lesser angle at the depression of numeral keys 161 of lower value and at a greater angle at the depression of numeral keys of higher value.

In order to hold numeral keys 161 and their associated key levers in their depressed position, each key lever 160 has pivoted thereto at its forward end a pendant 170 guided at its lower end in the framework of the machine; and said pendant is provided with ratchet teeth 171 adapted to engage a slidably and horizontally mounted spring-pressed bar 172, the forward end of which engages the teeth 171 of the pendant 170. The teeth of the pendant are so formed as to pass idly over the forward end of the bar 172 against the tension of its spring, but will be prevented from passing the bar 172 in an upward direction, thus holding the associated key lever in its depressed position, until released by the bar 172, as will hereinafter appear.

To index the multiplier on the machine, the keyboard 52 is provided with numeral keys 201 pivoted on a numeral key lever 200, in a manner similar to the mounting of the numeral keys of the multiplicand keyboard, and held in their normal position by springs 53. They are provided with projections 54, which on depression of said keys, are thrust against stops 55, fast to the framework of the machine, said stops serving to limit the downward movement of the numeral key levers 200 (Fig. 1). Each of said key levers 200 is provided with a pendant 203, which has teeth formed thereon adapted to be engaged by a spring pressed bar 204 to hold said key lever in its depressed position, said holding means being similar to that provided for holding the key levers 160 of the multiplicand keyboard when depressed. The stops 55 are graded, so as to arrest the depression of the multiplier key levers 200 after they have been moved through arcs corresponding to the values of the numeral keys thereon, by which they are depressed.

It will be noted by reference to Fig. 1, that the numeral keys 161 and 201 overlie each other in close proximity, so as to permit a compact construction, and avoid excessive angular motion of their respective key levers at the depression of the highest numeral key thereon, such as would be required if said keys were placed at a greater distance apart. At the depression of any numeral key all the other numeral keys of higher value which underlie the numeral key actuated, will be depressed therewith, but their extensions 164 and 54 and respective stops 166 and 55 are so formed that only the extension 164 or 54 of the intentionally actuated numeral key will be intercepted by its associated stop.

The indexing mechanism for the multiplier consists of stepped plates 206, one for each denomination in the multiplier keyboard 52, each plate having formed thereon steps 207, one for each digit in the multiplier keyboard, from "0" to "9." A mechanism hereinafter to be described as intervening between the multiplier index plates 206 and the multiplicand index pins 139 is adapted to be dependent as to the extent of its motion upon the position to which the multiplier index plates 206 are moved, the multiplicand index pin coöperating with said intervening mechanism in the setting up of partial products which are mutually dependent upon both the multiplicand and the multiplier indexing mechanisms. Said partial products are subsequently registered on totalizer dial wheels 307, by means which will presently appear.

In order to move the stepped plates 206 to a position corresponding to the numeral key depressed, each key lever 200 is provided with an extension 202, having a pin 56 at its rearward end extending through a slot 57 in the stepped plate 206, below its pivot 205ª, said stepped plate having a slot 58 formed therein, which passes over a rod 205 (Fig. 1), which forms a pivot about which the numeral key levers 200 swing. At the depression of the numeral keys 201, the extensions 202 and their pins 56 will be swung rearwardly about the rod 205 to swing upwardly the multiplier index plates 206 about their pivots 205ª a distance corresponding to the numeral key depressed, so that one of the steps 207 corresponding to the value of the numeral key depressed will lie in the path of motion of said intervening mechanism, to arrest the motion of the latter at a point dependent upon the indexing of the multiplier, and coöperating with the multiplicand index pins to cause parts of said intervening mechanism to be moved extents corresponding to the partial products of the computation being performed.

In order that the multiplicand index pins 139 may be moved about the rod 100, extents corresponding to the partial products, to be set up, the machine is provided with a general operator handle 210 (Fig. 1), fast to the right end of a rockshaft 211, extending across the machine (Fig. 2), and said rockshaft has fast thereon a gear segment 212, which is out of engagement, when in normal (Fig. 1) position, with a pinion 213, in mesh with a gear wheel 220, fast on a horizontally disposed cylindrical drum 104, Figs. 2 and 3, rotatably mounted on a rod 100, extending across the machine, and fixed to the framework A thereof. At the rearward stroke of the general operator handle 210, the rock shaft 211 and gear segment 212 will be swung in clockwise direction, as seen in Fig. 1, to engage and rotate a pinion 213, to rotate the gear 220 and rotate therewith the drum 104 in clockwise direction, as seen in Fig. 1, and counterclockwise direction, as seen in Fig. 3.

The drum 104 has slots 135 cut partially around its periphery, one for each index pin 139, each slot carrying a slide 136, each of which has a sleeve 137 through which passes one of the index pins 139. Each slide 136 is provided with a leaf spring 136ª adapted to hold said slides against the face of the drum, and cause a frictional contact therebetween, so that the drum 104 will tend to move said slides and their pins about its pivot 100. The drum 104 is provided with annular racks 153 extending entirely around its periphery and slidably mounted thereon, and each of said racks is provided with a ratchet 144; there being one rack and one ratchet for each multiplicand index pin 139, (Figs. 1, 2, 3, 4 and 5). Each slide 136 has pivoted thereon a pawl 143, (Fig. 1) adapted to move idly over the teeth of the corresponding ratchet 144, during the clockwise (Fig. 1) rotation of the drum 104; the racks 153 being held against clockwise (Fig. 1) rotation by pawls 180 spring-pressed into engagement with the teeth of the ratchets 144, so as to hold said racks and their ratchets against rotation during the clockwise rotation of the drum 104. During said clockwise rotation of the drum 104, the slides 136, after being released from engagement with lugs 169 of key levers 160, and from engagement with the walls of the recesses 69 of the releasing bar 145, as hereinafter described, will move with said drum extents corresponding to the products of the computation being effected, at which points they will be held against further rotation; the drum 104 thereafter moving idly to the extreme end of its clockwise rotation, as will hereinafter appear.

During the return or forward stroke of the general operator handle 210, the drum 104 will be rotated in counter clockwise direction (Fig. 1), through the intermediary of the segment 212, pinion 213, and gear 220, and will rotate therewith the racks 153 through the agency of the slides 136, the pawls 143 thereon engaging their associated ratchets 144, so that said ratchets and their connected racks 153 will rotate with the slides 136, until said slides have reached their normal (Fig. 1) position, at which time said racks will have been rotated extents corresponding to the partial products of the computation. During this rotation of the racks, on the return stroke of the general operator handle, the gears of the totalizer are in mesh with said racks, so that the partial products may be registered on said totalizer.

The slots 135 of the drum 104 are of such extents that the ends thereof will engage any of the slides 136, which have not been driven to their normal positions during the return stroke of the general operator by the agency of friction between the slides and said drum, to positively move said slides to their normal positions, and thus rotate the racks 153 to their full extent, so that the partial products will necessarily be fully registered on the totalizer.

In order that the slides 136 may, on each reciprocation of the general operator, be moved, in clockwise direction (Fig. 1), extents corresponding to the partial products which would result from multiplying the digits of the multiplicand severally by a digit of the multiplier, the following hereinbefore mentioned intervening mechanism coöperating with the indexing mechanisms is provided.

Each index pin 139, when released to rotate with the cylindrical drum 104, is adapted to engage one of a nest of bails 126$^e$, (Figs. 1 and 4) which extend across the interior of the drum 104, in positions so related, one to the other, that any index pin 139 thereon may engage any of the bails 126$^e$, the particular bail selected by said pin depending upon the position to which said pin had been raised as a result of the depression of an associated multiplicand numeral key 161. The bails are supported at either end by arms 126 of product sector plates or gages 130 (Figs. 1, 4 and 5). The product sector plates 130 are eighteen in number, arranged in two sets of nine each, the respective sets being located within the drum at opposite ends thereof, and the respective plates being loosely mounted to freely swing about the rod 100 as a pivot (Figs. 1 and 5). The pairs of product sectors 130 (Fig. 1) are respectively provided with stepped digit stops 131, 131$^a$, 131$^b$, 131$^c$, 131$^d$, 131$^e$, 131$^f$, 131$^g$ and 131$^h$, nine in number equally spaced from each other in a radial direction from their center 100, and also spaced at angular distances from each other directly proportional to the values of the multiplicand numeral keys, in the corresponding position of which, when one of said numeral keys is depressed, an index pin 139 will engage a bail 126$^e$ of the sector 130. That is to say, when the "1" numeral key is depressed on the multiplicand keyboard, the associated index pin 139 will be moved to a position to effectively engage the bail 126 of the pair of product sectors 130 which carry the stops 131 having the smallest angular distance between the respective steps thereof, and when the "9" numeral key is depressed, the index pin 139 will be raised to a position to engage the bail 126$^e$ of the pair of product sectors 130 which carry the stops 131$^h$ having the greatest angular distances between their steps. The total angular distance between the extreme steps of the stops 131 corresponds to the value of one multiplied by nine. The total angular distance between the extreme steps of the stops 13$^a$ corresponds to the value of two multiplied by nine, and so on to the steps of the stops 131$^h$ of the product sector 130 on which the total angular distance between the extreme steps corresponds to the value of nine multiplied by nine.

The sectors 130 are normally held against rotation by a common multiplier stop bar 105, which normally overlies a surface 59 formed on each of the stepped product sectors 130 to hold said sectors in their normal zero position, so that their bails 126$^e$ will lie in contact with the index pins 139, when said index pins occupy their normal zero position. In order that the sectors 130 may be rotated extents corresponding to the partial products, as indexed by the multiplicand and multiplier index mechanism, the multiplier stop bar 105 is adapted to be moved radially of the pivot of the product sectors 130, so that it may be brought into the path of the various steps of the stops 131 to 131$^h$ inclusive, to arrest the motion of said sectors after they have moved to points corresponding to the partial products of the computation.

To cause the multiplier stop bar 105 to be moved radially of the drum, there is provided, in mesh with the gear segment 212 of the general operator, a pinion 59$^a$ fast on a shaft 60, which has a one-way ball clutch connection 61 (Fig. 3) with a gear 62 adapted to be engaged and rotated with the shaft 60 during the rearward stroke of the general operator handle 210. The gear 62 meshes with and rotates an intermediate pinion 63, which meshes with and rotates a gear 64 fast on a sleeve 65 (Figs. 2 and 3), mounted concentrically of the drum 104 and said sleeve has fast thereon a cam 188, engaging a roller 66, fast to the upper end of an arm 187, fast on a rock shaft 186, (Figs. 1, 2 and 3). During the rearward stroke of the general operator handle 210, the cam 188 will be rotated through the above-described gears 212, 59$^a$, 62, 63 and 64, in a clockwise direction (Fig. 3), to a position 180 degrees from its normal position, during the first part of which movement it will ride out from under the roller 66 to permit clockwise rotation of the arm 187. By additional mechanism hereinafter described, the return of the general operator handle will cause an additional rotation of the cam 188, in the same direction, to its normal position, as shown in Fig. 3.

Fast to the rock shaft 186 is an arm 185, the upper end of which engages a fork 113, carried by a depending arm 112 fast on a sleeve 103, loosely mounted on the rod 100, (Figs. 1, 4 and 5). The sleeve 103 extends without the cylindrical drum 104, at the right side thereof, and extends within said drum along the rod 100 to its left side, as seen in Figs. 4 and 5; said sleeve being held against motion lengthwise of the rod 100 by pins 102 passing through and fast on the rod 100, (Figs. 1, 4 and 5) and passing through slots 67 formed at each end of the sleeve 103, so as to permit angular movement of said sleeve, but to hold said sleeve, as well as the cylinder 104 and connected parts, against lateral motion. The sleeve 103 is provided at either end within the drum with extensions 110, having cam slots 111 formed thereon, each of which engages a pin 109 carried by a pair of sleeves 106, each of which is slidably mounted on the forward end of one of the guide pins 102. On said sliding sleeves 106 is mounted a universal multiplier stop bar 105, (Fig. 5), extending lengthwise of the interior of the cylindrical drum 104, and across the path of angular rotation of all the product sectors 130. To prevent binding of the slides 106, on their guide pin 102, each slide 106 is provided with an extension 108 connected to collars 107 slidably mounted at the rear end of the guide pins 102, the connected slides 106, extensions 108, collars 107 and stop bar 105 forming a sliding framework on the pins 102.

At the rearward stroke of the general operator handle 210, the cam 188, as above explained, will be rotated in clockwise direction, as seen in Fig. 3, and will therefore be moved away from the roller 66, to allow the arm 187 to swing in clockwise direction, as seen in Fig. 3, and in counterclockwise direction, as seen in Fig. 1, under the tension of its spring 189, Fig. 1, so as to swing the arm 185 in engagement with the fork 113 in counterclockwise direction, as seen in Fig. 1, said motion being transmitted to sleeve 103, and parts fast thereon in clockwise direction, so that the cams 111 will move the sleeves 106 forwardly along the guide pins 102 and therewith the universal multiplier stop bar 105. The fork 113 is of sufficient length to prevent its disengagement from the arm 185 when said arm swings to its extreme forward position.

To limit the forward motion of said bar 105, the arm 112 fast on the sleeve 103 is provided at its lower end with a slideway 114 in which is slidably mounted a denominational slide 116, having a forward extension 117 adapted to engage one of the steps 207 on one of the multiplier stop plates 206, said step having been previously moved into the path of said arm 117 as a result of the depression of the corresponding multiplier key 201. The arm 112, and all connected parts, will thus be held against the tension of the spring 189, in a position corresponding to the digital value of the step 207 in engagement with the arm 117.

It may be noted in passing that the multiplier stop bar 105 will reach the extreme limit of its forward motion through the intermediary of its connections with the general operator, before the general operator segment 212 has come into engagement with the gear 213 through which the cylindrical drum 104, and therewith the product sectors 130, are rotated.

After the stop bar 105 has been moved forwardly along the guide pins 102 to a position dependent upon the value of the depressed numeral key 201 of the denomination in which computation is taking place, further rearward movement of the general operator handle 210 will cause its gear segment 212 to engage and rotate the pinion 213 and the gear 220, and therewith the cylindrical drum 104, and each released multiplicand index pin 139, frictionally carried therewith, will engage the bail 126° of a pair of product sectors 130, and move said pair of sectors with the drum until one of the steps of the corresponding stops 131, 131$^a$, 131$^b$, etc., as the case may be, has been brought into engagement with the stop bar 105 to arrest the corresponding index pin 139 against further clockwise (Fig. 1) motion. It will be observed that the various index pins will be arrested in different positions depending upon the positions in which they have previously been set by the multiplicand numeral keys, as a result of which they engage different bails 126°.

It is provided that only those index pins 139 which have been moved to a position corresponding to digits in the multiplicand greater than "0" should rotate with the drum, and that those of the index pins 139 representing the digit "0" in the multiplicand keyboard should be held against rotation.

In order to hold the slides 136, and connected parts of such of the index pins as are not set up by depression of their respective keys 161 in their normal "0" position (Fig. 1) during the actuation of the general operator, there is provided, on each arm 162, a projection 169, which rests in a notch 136$^b$ when the key levers 160, 162, are in their normal "0" position, so as to hold the slides 136 against motion in either direction.

It is also desirable to prevent movement of the slides 136, of such of the index pins 139 as are set up at the depression of the multiplicand numeral keys 161, and the corresponding slides of which are thereby released from the normal locking engagement between the projections 169 and the notches 136$^b$, until after the multiplier stop bar 105 has completed its forward stroke and is in position to properly limit the movements of the product sectors 130. For this purpose, there is provided a releasing bar 145 (Figs. 1, 2, 3, 10 and 11), universal to all the multiplicand index pins 139. The bar 145 has notches 68 formed therein, one for each index pin 139, and said notches are of such form as to provide cam edges 148 and recesses 69 (Figs. 10 and 11), said recesses normally engaging the index pins 139 below their heads 140 and below the forks 168 of the multiplicand numeral key levers (Figs. 1 and 2), to hold said index pins against rotation with the cylindrical drum 104 when said bar 145 is in its normal position.

In order to release the index pins 139 from engagement with the recesses 69, the releasing bar 145 is provided with a cam 149, and there is pivotally mounted on the drum 104 a finger 150 (Figs. 1 and 11), to engage said cam on sufficient rotation of said drum, as said general operator 210 is moved to the rear. The finger 150 is so positioned upon said drum that when the drum is in its normal position the finger will be at such distance from the cam that it will not engage therewith, during the actuation of the general operator handle 210 until the stop bar 105 has completed its movement along the guide pin 102 and come to rest. After the stop bar 105 has been positioned in accordance with the value of that digit of the multiplier in the denomination of which computation is taking place, the finger 150 will engage the cam 149 (Figs. 2 and 11), to move the universal bar 145 leftwardly against the tension of its spring 146, so as to move the recesses 69 out of engagement with the index pins 139 and to bring the notches 68 opposite said pins, so that they may be moved away from the universal bar 145, unless retained by the projections 169 on the multiplicand numeral key levers. On the return of said drum to its normal position, the finger 150 will turn about its pivot and pass underneath the cam 149 on the releasing bar 145, without moving the same, a spring 151 being provided to restore said finger to its normal position.

After the release of the set index pins 139 from the recesses 69 in the bar 145, as above set forth, further motion of the cylindrical drum 104 will be transmitted through their slides 136 to the set index pins 139, the lower end of each of which will engage and move therewith a bail 126° of the product sector 130 corresponding in value to the depressed multiplicand numeral key 161 of corresponding order with said pin. Each of the set pins 139, together with its corresponding product sector 130, will continue to move with the drum 104 until one of the steps 131 to 131ʰ of said corresponding product sector 130 comes into engagement with the universal multiplier stop bar 105, to arrest it, after moving a distance dependent upon the position of the multiplier stop bar 105 along the guide pin 102, said position being determined by the depression of one of the numeral keys 201 of the multiplier keyboard 52. Since the distances between the steps 131 to 131ʰ, inclusive, are directly proportional to the products of the digits represented by the multiplicand keys 161 and the digits represented by the multiplier numeral keys 201, as hereinbefore described, it will be seen that each of the product sectors 130 will be arrested in its motion at a point corresponding to the partial product of the digital value corresponding to the position occupied by its driving index pin 139 and the value of the digit corresponding to the position of the bar 105. Since each of the slides 136 is arrested when the product sector 130, with which it has been brought into coöperative relation is arrested, and after having made the same angular movement, the various slides will be advanced from their normal "0" positions distances corresponding to the values of the same partial products to which the angular movements of the corresponding product sectors 130 have been shown to be proportional. During this clockwise rotation (Fig. 1) of the slides 136, their pawls 143 will move idly over their associated ratchets 144, but on their return strokes to normal, the pawls will engage the ratchets to rotate the latter and their connected annular racks 153 in counterclockwise direction (Fig. 1) distances corresponding in value to the distances the respective slides 136 were previously moved during their clockwise rotation, that is, distances corresponding to the respective partial products. This rotation of the racks 153 will be transmitted through suitable gearing to the dial wheels 307 of the totalizer, as will be hereinafter set forth.

In order to arrest the slides 136 when they arrive at their normal positions at the ends of their movements, due to the return rotation of the drum in counterclockwise direction, as seen in Fig. 1, and not before, the pins 139 are adapted to first engage the cam edges 148 of the numeral pin releasing bar 145, to move said bar leftwardly (Figs. 2 and 11) until the pins have arrived at a point opposite the recesses 69 formed in said bar, at which time the bar will be moved back to its normal position by the power of the spring 146 to hold the index pins 139 and connected parts in their normal positions.

It is advantageous to prevent overthrow rotation of the annular racks 153 in counterclockwise direction (Fig. 1), which might be imparted thereto by momentum after the slides 136 have come to rest at their normal "0" position. For this purpose, there is provided a universal locking bar 153ª, extending across and outside of the drum 104. Said bar normally overlies the free ends of the pawls 143 (Fig. 1), to prevent motion of said pawls about their pivots, such as would be imparted thereto by overthrow rotation of the character indicated. By thus preventing the pawls 143 from being actuated by such further counterclockwise rotation (Fig. 1) of their associated ratchets 144 and racks 153, said racks and ratchets will be positively held against overthrow at the end of a computation.

In order that the slides 136, upon the pins of which digits greater than "0" have been indexed, may be free to rotate with the drum 104 after they have been released, it is desirable to release the pawls 143 so that they may freely pass over their respective ratchets 144. For this purpose, the universal locking bar 153ª is adapted to be moved out of engagement with the pawls 143 during the initial part of the rearward stroke of the general operator handle 210 and before the finger 150 of the cylindrical drum 104 has reached the cam 149 formed on the universal index pin releasing bar 145. The locking bar 153ª is mounted on an arm 154 (Fig. 1), fast on a rock shaft 154ª, to the left end of which (Fig. 2) is fast an arm 154ᵇ, carrying at its rearward end a roller 70 in engagement with a cam 71, fast on a shaft 72, journaled in the framework of the machine and on which is fast a gear 73 in mesh with a pinion 74 fast on the shaft 60, on which is fast the pinion 59ª which meshes with the general operator gear segment 212. At the initial part of the rear stroke of the general operator handle 210, in counterclockwise direction as seen in Fig. 3, the pinions 59ª and 74, directly driven by the gear segment 212, will be rotated in clockwise direction, to rotate the gear 73 and cam 71 in counterclockwise direction, to cause the high portion thereof to move away from the roller 70 on the arm 154ᵇ, which is pressed into engagement with said cam by a spring 75, so as to rock the shaft 154ª in clockwise direction, and therewith the locking bar 153ª out of engagement with the pawls 143. The gearing between the general operator segment 212 and the cam 71 is so proportioned, relative to the gearing which drives the drum 104, that the lower portion of the cam 71 will come into engagement with the roller 70, thereby effecting the release of the pawls 143, before the finger 150 on the drum 104 will have reached its effective position with respect to the cam 149 of the releasing bar 145, to release the multiplicand index pins 139, and connected parts, and permit them to rotate with the drum, during which time the pawls 143, associated with said pins, will be free to idly pass over their respective ratchets 143. The low portion of the cam 71 is concentric with the shaft 72 so as to keep the locking bar 153ª in its ineffective position throughout the rearward stroke of the general operator handle 210 and the greater part of its return stroke, the gear 73 and its coöperating drive gearing being so proportioned so that said gear does not make a complete revolution during the rearward stroke of the general operator 210, so that the high portion of the cam 71 will not become effective during said rear stroke of the general operator. During the return stroke of the general operator, the direction of rotation of the gearing connected with the cam 71 will be reversed to reverse the rotation of the cam 71, at the end of which reverse rotation its high portion will engage the roller 70 to rock the shaft 154ª in counterclockwise direction (Fig. 3) against the tension of the spring 75, to move the locking bar 153ª into effective position, ready to engage any of the pawls 143 as they reach their normal "0" position, during which time the locking bar 153ª is positively held in its engaging position by the cam 71 in engagement with the arm 154ᵇ.

In order that the partial products, corresponding to the multiplication of the multiplicand by the denominational values of the several digits in the multiplier, may be registered, as computation takes place in the successive denominational orders of the multiplier, the machine is provided with a totalizer, the dial wheels 307 of which are provided with pinions 306, secured thereto and constantly in mesh with gear wheels 304, normally in mesh with the annular racks 153 of the cylindrical drum 104. The dial wheels 307 and gear wheels 304 are mounted on shafts 310 and 76, respectively, mounted in a totalizer frame B, pivotally mounted on a rod 300 (Figs. 1, 2, 3 and 7), and normally held by an escapement mechanism, hereinafter to be described, against the tension of a spring barrel 250 and a band 251, connected to said frame B, in a normal position, in which the gear 304 of units order of the totalizer will be in mesh with the rack 153 of units order on the drum 104. At this time the extension 117 of the denominational slide 116 will be in engaging position with one of the steps 207 of the plate 206, associated with the numeral keys 201 of units order of the multiplier. At the return actuation of the general operator handle 210, when the parts are in this position, the dial wheels 307, through the intermediary of the gears 304, will be rotated extents corresponding to the extent of rotation of their respective annular racks 153.

The dial wheels 307 bear the numerals "0" to "9" on their peripheries and said numerals are adapted to appear at a sight-opening 77, formed in the frame B. Each time that a dial wheel 307 is so rotated that the space between the numeral "9" thereon and the adjacent "0", hereinafter referred to as the "9" to "0" space, is caused to pass the sight-opening 77, it is necessary to impart to the dial wheel of next higher order an angular movement corresponding to one digit in addition to any rotation which may be imparted thereto by its annular 153. The passing of the "9" to "0" space at the sight-opening 77 may occur a plurality of times during a single driving action by the racks 153,—eight times, for example, in the multiplication of "9" by "9". For this purpose, the totalizer is provided with carry-over mechanism for each dial wheel upon which a plurality of carry-over actions may be initiated corresponding in number to the number of times its "9" to "0" space passes the sight-opening 77 during its rotation by its rack 153, said carry-over mechanism also being effective during the rotation of the dial wheels 307, when operated to complete a previously initiated carrying action, as will hereinafter appear.

In order to set up or initiate carry-over actions from wheels of lower to wheels of higher denomination, during the rotation of the dial wheels 307 by means of the annular racks 153, each dial wheel, except the dial wheel of highest denomination, is provided with a carrying tooth 308 (Figs. 18, 19, 21 and 25) adapted to engage and rotate a mutilated pinion 313 when the "9" to "0" space on the dial wheel passes the sight opening 77 of the totalizer. The pinion 313 meshes with a gear wheel 320 loosely mounted on a shaft 321, and which normally engages a pin 327 on a stop slide 323, which has a shouldered stop pin 328 projecting laterally from a point near one of its ends (Figs. 14, 18 and 19). The slides 323 are guided radially of the shaft 321 by slotted guide plates or disks 326, loosely mounted on said shaft and each having two slots therein, oppositely disposed with respect to each other, and lying on opposite sides of the shaft 321. Guide pins 324, 325, carried by said slides 323, ride in said slots and thus determine the relative direction of movement between said slides and said disks. To force each of said slides in a direction such that its pin 327 will tend to normally engage its associated gear wheel 320, it is provided with a spring 330, one end of which is secured to the slide and the other to its associated disk 326. When a dial wheel 307 moves from "9" to "0" at the sight opening 77 its carrying tooth 308 will, through the intermediary of its mutilated gear 313, rotate its gear wheel 320 in counterclockwise direction, as seen in Figs. 17 and 19, through an angle corresponding to one digit, in the subsequent carry-over completing operation. Such rotation of the gear 320 will be transmitted to the slide 323, which is in engagement therewith, and to the associated guide plate 326. In case two or more of the dial wheels 307 are rotated through the intermediary of their corresponding annular racks 153, so that their "9" to "0" spaces pass the sight-opening 77 a plurality of times, as, for example, in the multiplication of "9" by "9," when they pass eight times, each of the associated gear wheels 320 and stops 328, through the intermediary of its associated pinion 313 and carrying teeth 308, will be rotated through an angle corresponding to a number of digits equal to the number of times the "9" to "0" space on its associated dial wheel has passed the sight opening 77. That is to say, when a dial wheel 307 has its "0" at the sight opening 77, and the multiplication of "9" by "9" is being performed on said dial wheel, its carrying tooth will pass and actuate the pinion 313 eight times, thus moving the stop 328 through an angle corresponding to eight digits from its normal position. If, however, the dial wheel upon which said computation is taking place should initially stand with its "9" at a sight opening, its carrying tooth 308 will pass and actuate the pinion 313 nine times in its rotation, thus rotating the gear wheel 320 and its associated stop pin 328 through an angle corresponding to nine digits from its normal position.

In order that a dial wheel 307 of next higher denomination may be rotated through a digital angle corresponding to the angle through which a stop pin 328 of the wheel of lower denomination is rotated by the latter during its rotation through the intermediary of its annular rack 153, there is provided for each stop pin 328 a coacting stop pin 328ª, carried by a slide 323ª mounted in association with a guide plate 326 in a manner similar to the mounting of the slide 323, and said slide 323ª is provided with pins 324ª and 325ª which ride in like manner in the guide slots of said disk. The disks 326, associated with the slides 323ª, like those associated with the slides 323, are loosely mounted on the shaft 321 and each disk and slide is likewise provided with a spring 330 which tends to so move said slide that a pin 327ª thereon (Figs. 14 and 16) tends to engage a gear wheel 322, loosely mounted on the shaft 321.

At the end of the rotation of the annular racks 153 and their coöperating dial wheels 307, during the return stroke of the general operator handle 210, the totalizer gear wheels 304 are moved out of mesh with said annular racks by means hereinafter to be described and are moved into mesh with frictionally driven gears 229, of which there is one for each of the annular racks 153, except the one operating the units, and there is an additional gear 229 at the left for effecting the registration of carried figures on an extra dial wheel (not shown) when it is desired to accumulate two or more products of such magnitude that their sum will be a number of ten denominational orders. The units wheel is prevented from turning by a stop 229ª. The gears 229 are adapted to rotate in counterclockwise direction, as seen in Fig. 1, during the return stroke of the general operator handle 210, after the gear wheels 304 have been brought into mesh with the gear wheels 229. The pins 327ª are normally out of mesh with their associated gears 322, but are moved into mesh with said gears by their springs 330, so as to rotate therewith, this meshing of said pins and gears taking place after the annular racks 153 have ceased to rotate and before the gear wheels 304 of the totalizer begin to rotate through the intermediary of the gears 229. The gear wheels 322 are in mesh with pinions 309 loosely mounted on a shaft 311 concentrically with the mutilated pinions 313, said pinions 309 being constantly in mesh with the gears 322 and with gears 305 formed on all but one of the dial wheels 307, there being a gear wheel 322, a pinion 309, and a gear 305 for each dial wheel 307, except that of the units denomination.

After a carry-over action has been set up or initiated, as hereinbefore described, and the gears 304 have been moved into mesh with the frictionally driven gears 229, the counterclockwise rotation of the latter will be transmitted to the dial wheels 307 through the intermediary of the gears 304 and pinions 306, said rotation being also imparted to the gears 322 through the intermediary of the pinions 309, the gears 322 carrying therewith the counter stops 328ª which rotate with the gears 322 (Fig. 21) until the shoulders on said counter stops have been moved into contact with the shoulders of the stops 328 on the wheels of lower denomination at which point further rotation of the dial wheels associated with said counter stops will be prevented. It will be seen that each counter stop 328ª will move through an arc corresponding to the arc of digital angle through which its associated stop 328 has previously been moved during the initiation of the carry-over action by the wheel of next lower denomination, the dial wheel of the higher denomination therefore rotating a corresponding digital angle to bring the proper numeral to the sight-opening to correctly indicate the effect of the carry-over operation.

Should no carry-over action be initiated by a dial wheel 307 of any denominational order during its initial rotation through the intermediary of one of the racks 153, its associated stop pin 328 would remain in its normal position in which it would immediately engage the counter stop pin 328ª, to prevent movement thereof, at the same time at which its associated pin 327ª is caused to drop into mesh with the gear 322, by means which will presently be described.

For the purpose of holding each of the stop pins 328 and its connected parts against rotation, except when its associated dial wheel is passing from "9" to "0" at the sight opening 77, so as to form a positive stop against the rotation of the coöperating counter stop 328ª and associated parts, and to hold the slide 323 and connected parts against accidental rotation, the pinion 313 has long and short teeth 314 and 312, respectively, formed thereon, the short teeth 312 being in the same plane and in the path of the carry-over tooth 308, and the long teeth 314 extending across the entire face of the pinion 313 to form a Geneva lock with the periphery of the dial wheel (Figs. 17, 18 and 19), both long and short teeth meshing with the gear wheel 320 which is associated with the stop slide 323. It will be seen that the pinion 313 and associated parts cannot be rotated when the teeth 314 thereof are in contact with the periphery of the dial wheel, except when the "9" to "0" space of said dial wheel is passing the sight opening, at which time, a carry-over action is initiated. In order that the pinion 313 may be rotated at this time, the associated dial wheel 307 is provided with a recess 78 formed adjacent to the carry-over tooth 308, so as to allow the teeth 314 to pass thereinto during the rotation of the pinion 313 by the carry-over tooth 308 of the associated dial wheel. At all other times, however, the pinion 313 will be locked against rotation and therewith the gear wheel 320 and its associated parts at any point to which they may have been moved, said Geneva lock between the pinion 313 and the dial wheel 307 also serving to act as a positive lock or stop against overthrow at the completion of a carry-over action by the gear wheel 229 when the counter stop 328ª is brought into contact with the stop 328 at which time all the gearing associated with the counter stop 328ª, including the friction drive gear 229, will be held against rotation and against the action of the frictional driving force imparted thereto, by the motion of the general operator handle 210.

In order that the dial wheels of higher denomination than units may be rotated by the annular racks 153, the slides 323ª must be held out of mesh with the gear wheels 322 (Fig. 16) since the latter always rotate with the dial wheels through the intermediary of the pinions 309. For this purpose, there is provided on each slide 323ª a pin 79 (Figs. 14 and 16) adapted to be engaged by a notch 80 in the holding surface 334 of a cam 331ª fast on the shaft 321, when said cam is in its normal position, in which it remains during the entire initial rotation of the dial wheels 307 to hold the pins 327ª out of mesh with the gears 322, as seen in Fig. 16, associated with said dial wheels 307, in order to permit the latter to rotate.

If, during the rotation of the dial wheels 307 by the friction gears 229, the "9" to "0" space on a dial wheel should pass the sight opening 77, the associated stop pin 328 will be rotated through an angular distance corresponding to one digit in counterclockwise direction, as seen in Fig. 25, in addition to its counterclockwise carry-over rotation initiated during the rotation of the dial wheels by the annular racks 153. This extra rotation of the stop pin 328 may take place before or after its coöperating counter stop 328ª has come into contact therewith, to cause the wheel of next higher denomination to rotate through an additional angular distance corresponding to one extra digit.

In order that the gears 229 may drive the dial wheels 307 until their associated counter stops 328ª have come into contact with the stops 328 of the dial wheel of next lower denomination, and no further, the gear wheels 229 are loosely mounted on a shaft 228 on which are keyed friction disks 231 which are forced into contact with the gears 229 by springs 230, so as to frictionally drive said gears 229 with the shaft 228 when said gears are free to rotate. In order to rotate the shaft 228, there is fast on the general operator rock shaft 211, a bevel gear segment 215 (Figs. 1, 2 and 3), which is normally in mesh with a bevel pinion 225 fast on an upwardly extending shaft 226 journaled on the left side of the machine frame A, and has fast at its upper end a bevel pinion 227 meshing with a bevel pinion 81 fast on the shaft 228.

During the rearward stroke of the general operator handle 210, the bevel gear segment 215 will rotate the shaft 226, through the gearing thereon, and will rotate the shaft 228 in clockwise direction, as seen in Fig. 1, and therewith the gears 229 idly during which time the gears 304 of the totalizer will be in mesh with the annular racks 153 and out of mesh with said gears 229. This idle rotation of the gears 229 will continue during the rearward stroke of the handle 210 until the bevel gear segment 215 moves out of mesh with the bevel pinion 225, the frictionally driven gears 229 remaining idle during the remainder of the rearward stroke of the handle 210. During the initial part of the return stroke of the handle 210, the gears 229 will remain stationary until the bevel gear segment 215, during the later part of the return stroke of the general operator, comes into mesh with its bevel pinion 225, and through the intermediary of the shaft 226, bevel pinions 227, 81, shaft 228, and friction disks 231, rotates the gears 229 in counterclockwise direction, as seen in Fig. 1, the action of the parts being so timed that the totalizer will be moved into mesh with the gears 229 on the return stroke of the handle 210 prior to the meshing of the bevel gear segment 215 and pinion 225, as will hereinafter appear, the gearing being so proportioned as to rotate the gears 229 a distance in excess of that required to rotate the dial wheels 307 in the completion of a carry-over action, thus insuring that the dial wheels 307 will be rotated their full extent during said action.

In order to rock the totalizer carriage B about its pivot 300 so as to move the totalizer gears 304 out of mesh with the annular racks 153 and into mesh with the frictionally driven gears 229, the totalizer carriage B is provided with extensions 82 which overlie a bail 83 (Fig. 3) mounted on a rock shaft 301 near the left end of which is fixed an arm 301ª (Figs. 2 and 3), which is normally in engagement with a cam 301ᵇ, as seen in Fig. 3, in which normal position the gears 304 of the totalizer are in mesh with the annular racks 153 of the cylindrical drum 104. The cam 301ᵇ is fast on the sleeve 65, on which is mounted the cam 188 and gear 64. As hereinbefore described, the gear 64 and connected parts, including the cam 301ᵇ, will rotate half a revolution during the rearward stroke of the general operator handle 210 through the intermediary of the general operator gear segment 212, pinion 59ª, shaft 60, ball clutch 61, pinion 62 and pinion 63, the cam 301ᵇ moving idly during said first half of its rotation (Fig. 3). During the return (forward) stroke of the general operator handle 210, the gear segment 212 will rotate the pinion 59ª and shaft 60 in counterclockwise direction, as seen in Fig. 3, but said rotation will not be transmitted to the pinion 62 owing to the one-way ball clutch 61 which would rotate intermediate pinion 63 and gear 64 in an opposite directon to that in which they were rotated during the rearward stroke of the handle 210, were it not for the fact that the ball clutch 61 is ineffective during the return (forward) stroke of the handle 210. In order to complete the rotation of the gear wheel 64 during the return stroke of the handle 210, so that its connected cam 188, 301ᵇ, may become effective near the end of said stroke, the gear wheel 64 is adapted to be rotated one-half a revolution in the same direction, that is, clockwise, as seen in Fig. 3, during the return stroke of the handle 210, as the direction in which said gear was rotated during the rearward stroke of said handle. For this purpose, the pinion 74 is fast on the shaft 60 and meshes with the gear wheel 73, which meshes with a pinion 84 having a one-way ball clutch connection 85 with a shaft 86 which has fast thereon, a pinion 87 in mesh with the gear 64. During the return (forward) stroke of the general operator handle 210 (Fig. 3), the gear segment 212 will be rocked in clockwise direction to rotate the pinions 59 and 74 in counterclockwise direction, to rotate the gear wheel 73 in clockwise direction, to rotate the pinion 84 in counterclockwise direction, to rotate the gear wheel 64 in clockwise direction through half a revolution, to move the cams 188, 301ᵇ in clockwise direction, to their normal position. The cam 301ᵇ, during the latter part of said motion, will engage the arm 301ᵃ to rock the shaft 301 in clockwise direction, as seen in Fig. 3, to raise the bail 83 and therewith extensions 82 of the totalizer carriage B, to swing said carriage about its pivot 300, to move the gears 304 out of mesh with the racks 153 and into mesh with the frictionally driven gears 229, so that any carry-over action previously initiated by the racks 153 may be completed by the rotation of the gears 229. The pinion 62 on the shaft 60 being connected to the gear 64 through the intermediary pinion 63, will be rotated in clockwise direction during the return stroke of the handle 210 during which time the shaft 60, on which said gear 64 is mounted, will rotate in counterclockwise direction, the rotation of the intermediate pinion 63 and the pinion 62 being idle and ineffective owing to the one-way ball clutch connection 61, which is ineffective during the return stroke of the handle 210.

When the gear wheels 304 of the totalizer are moved into mesh with the frictionally driven gears 229 to complete any carry-over action which may have been initiated during the initial rotation of the dial wheels 307, it is necessary that the slides 323ᵃ be so moved that the pins 327ᵃ thereon will come into mesh with their respective gear wheels 322 before the latter are rotated by the gears 229 in order to complete said carry-over action. The pins 79 (Figs. 14, 16 and 17) normally rest in the notches 80 of the cams 331ᵃ, as hereinbefore described. In order that the cams 331ᵃ may be rotated in clockwise direction, as seen in Figs. 17 and 19, so as to move the holding surfaces 334 formed thereon away from the pins 79 and thus permit the pins 327ᵃ of the slides 323ᵃ to be moved into mesh with their respective gear wheels 322 by the springs 330, the shaft 321, on which are rigidly mounted said cams, is provided with a square portion 243, slidingly mounted in a pinion 87ᵃ (Figs. 2 and 3) and adapted to be rotated thereby, said pinion being journaled in a part B′ of the framework of the totalizer B. The pinion 87ᵃ is in mesh with a gear wheel 242 fast on a shaft 88 (Figs. 2 and 3) also journaled in the framework of the totalizer, and has a ball clutch connection 89 with a gear wheel 90 loosely mounted on said shaft and meshing with a rack bar 240 slidingly mounted on the framework of the totalizer, said rack bar being adapted to reciprocate during the return (forward) stroke of the general operator handle 210. The pinion 87ᵃ, gears 242 and 90, shaft 88, ball clutch 89, and rack bar 240, are mounted in the part B′ (Fig. 2) of the non-traveling part of the general totalizer frame B. This part B′ is rotatably mounted so as to be rocked by the bail 83, the same as the other parts of the totalizer frame. Said part B′ maintains the coöperative relation between the cam 240ᵃ and the rack 240, which, through the gears 90, 242 and 87ᵃ and the square portion 243 of the sliding shaft 321, turns the cams 331, 331ᵃ. During the initial part of the return stroke of said handle 210, the rack bar 240 will be moved upwardly from its normal Fig. 3 position by means presently to be described, and will rotate the gear wheel 90 in counterclockwise direction (Fig. 3) idly on its shaft 88, said shaft and connected parts remaining stationary during said rotation of the gear wheel 90. During the latter part of the return stroke of the handle 210 and before the bevel gear segment 215 of the general operator comes into mesh with its bevel pinion 225, the rack bar 240 will begin to move downwardly from its elevated position to rotate the gear wheel 90 in clockwise direction, and therewith, through the ball clutch 89, the shaft 88 and gear wheel 242, to rotate the pinion 87ᵃ in counterclockwise direction, as seen in Fig. 3, and therewith the shaft 321, to rotate the cams 331ᵃ in clockwise direction, as seen in Figs. 14, 17 and 19, so as to move its holding surface 334 from the Fig. 19 to the Fig. 20 position, at which time, the slides 323ᵃ will be free to move under the influence of their springs 330, so that the pins 327ᵃ thereon may come into mesh with their respective gear wheels 322, the slides being guided by their pins 324ᵃ, 325ᵃ, which ride in the slots formed in their respective guide plates 326. After the slides 323ᵃ have been moved into engagement with their respective gears 322, the gear segment 215 will come into mesh with the bevel pinion 225, to rotate the gears 229 and therewith all of the gear wheels 322 and their associated slides 323ᵃ, to complete any carry-over action which may have been initiated; the gearing used to drive the gear wheels 229 and the shaft 321 are so proportioned and the cams fast on said shaft are so formed, that the rotation of said shaft will be idle during the rotation of the gear wheels 229 in which a carry-over action is being completed.

It is proposed not to actuate the rack bar 240 and associated parts during the rearward stroke of the general operator handle 210. The cam 240ᵃ, which is rotated to reciprocate said rack bar, is therefore adapted to remain stationary during the rearward stroke of the general operator handle 210, and adapted to rotate a complete revolution during the return stroke of said handle to reciprocate the rack bar 240; also to raise said rack bar to keep time with the raising of the carriage B to shift the gears 304 from engagement with the racks 153 to engagement with the friction gears 229. At the rearward stroke of the handle 210, the gear segment 212 will be rocked in counterclockwise direction, as seen in Fig. 3, to rotate in clockwise direction the pinion 59ª, shaft 60 and pinion 74, to rotate in counterclockwise direction the gear wheel 73, to rotate one complete revolution in clockwise direction a gear wheel 91, fast on a sleeve 92, rotatably mounted on the rod 100. Said sleeve 92 is provided with a tooth 93 which normally stands in engagement with a pawl 94 pivoted in a recess formed in the cam 240ª, and pressed into engagement with the sleeve 92 by a spring 95. It will be seen that during the rearward stroke of the handle 210, the clockwise rotation of the gear wheel 91 will carry the sleeve 92 and its tooth 93 therewith (Fig. 3), so as to move said tooth away from the end of the pawl 94 in clockwise direction until near the end of said rotation the tooth 93 will pass under the pawl 94, to move said pawl about its pivot against the action of its spring until the tooth 93 at the end of its clockwise rotation will pass the end of the pawl 94, so that it will be moved into cooperative position with the tooth 93 by its spring 95. During the return (forward) motion of the handle 210, the direction of the gearing associated with the tooth 93 will be reversed to rotate said tooth in counterclockwise direction, to rotate therewith the pawl 94 and connected cam 240ª one complete revolution during the first half of which said cam, acting on a roller 96 mounted on the lower end of the rack bar 240, will move said rack bar upwardly against the tension of its spring 97, during which time the ball clutch 89 will permit the gear 90 to rotate idly on the shaft 88. During the remainder of the return stroke of the handle 210, the counterclockwise rotation of the cam 240ª will cause the rack bar 240 to be drawn downwardly by the power of its spring 97, to rotate the gear wheel 90 in clockwise direction (Fig. 3), during which time said rotation will be transmitted to the shaft 321 and connected parts.

After the counter stops 328ª have come into engagement with the stops 328 on the slides 323 at the completion of a carry-over action, it is advantageous to return the slides 323 and 323ª to their normal position ready for the next computation. For this purpose, there are provided the cams 331ª, fast on the shaft 321, each cam 331ª being associated with one of the slides 323ª, and also fast on said shaft, there are provided cams 331, one for each slide 323, said cams 331 being provided with holding surfaces 334 similar to the holding surfaces 334 carried by the cams 331ª. The cams 331 are so fixed on the shaft 321 relative to the cams 331ª, that an abrupt drop 98 formed on the cams 331 stands slightly in advance of an abrupt drop 98ª formed on the cams 331ª (Figs. 20 to 25 inclusive). Said abrupt drops 98, 98ª (Fig. 14) are formed at the forward end of the holding surfaces 334, said cams 331, 331ª, having stop surfaces 333 formed at the other end of the holding surfaces 334, said holding surfaces being of a less extent on the cams 331 than on the cams 331ª, so that, although the abrupt drops thereon will be out of alinement lengthwise of the shaft 321, the stop surfaces 333 will be in alinement relative to the length of said shaft (Figs. 20 to 25 inclusive).

During the clockwise rotation of the shaft 321, as seen in Figs. 20 to 25 inclusive, through the intermediary of the rack bar 240 and connected gearing, the cams 331, 331ª thereon will rotate idly during the initial part of said rotation, as hereinbefore described, until any carry-over action initiated during the computation is completed. Upon further rotation of the cams 331, 331ª, the former will engage a pin 99 carried by the slide 323, and the latter will engage the pin 79 carried by the slide 323ª, to move said slides radially of the shaft 321, so that their respective pins 327 and 327ª will be moved out of engagement with their respective gears 320, 322, until the stop surfaces 333 formed on said cams come into engagement with the pins 79, 99, from which time on the slides 323, 323ª, will rotate with the cams 331, 331ª, as seen in Fig. 22, until the stop pins 328, 328ª, formed on said slides come into engagement with cam fingers 340 (Fig. 23), which, at this time, are held in such position that, during the latter part of the rotation of the shaft 321, said stop pins will be forced to ride up on the cam fingers 340, during which time, the slides will be moved radially, as well as angularly, to move the pins 79, 99, out of engagement with the stop surfaces 333 (Fig. 24), to a position slightly above the holding surfaces 334, until the cams 331, 331ª, have very nearly reached their normal position, at which time, the cam fingers 340 will drop, as will presently appear, and therewith the slides 323, 323ª, said slides being radially moved under the influence of their springs 330, so that the pin 327 on the slide 323 will come into engagement with its respective gear wheel 320, the pin 99 of said slide passing in front of the abrupt drop 98 of its cam (Fig. 17), and the pin 79 of the slide 323ª will come into engagement with the notch 80 formed on the holding surfaces 334 formed on the cam 331ª, the gear wheels of the totalizer and dial wheels being stationary during said return motion of said slides.

In order to actuate the cam fingers 340 from their normal (Figs. 17 and 19) position to their effective position (Figs. 23 and 24), and vice versa, there is fast on the shaft 321 a cam 344 (Figs. 17, 18, 20, 23 and 24) coöperating with a pin 343 spring-pressed toward the periphery of said cam and fast to the forward end of an arm 342 fast to a rock shaft 341 on which are rigidly mounted the cam fingers 340.

The stop pins 328, 328ª, stand in the path of angular motion of the cam fingers 340 when in their normal position, and when the counter stop pins 328ª and their slides 323ª have been moved into engagement with the gears 322, it is desirable that the cam fingers 340 should remain in their normal position until the stop pins 328, 328ª, which are to be moved in a carry-over action, have been moved out of the path of the cam fingers 340. For this purpose, the cam 344 has a lower concentric portion 345 formed thereon on which the pin 343 normally rests, said lower portion being of such an extent as to allow the cam fingers 340 to remain in their lower position during the rotation of the cam 344 until the pins 328ª, which are to be moved in the completion of a carry-over action, have been moved out of the path of said cam fingers.

In order to move and hold the cam fingers 340 to effective position, the cam 344 is provided with a high portion 346 onto which the pin 343 will be moved in the rotation of the cam 344, to rock the arm 342 and shaft 341 against the tension of its spring 347 (Fig. 18) and therewith move the cam fingers 340 into effective position, the cam 344 being so formed and fixed to the shaft 321 relative to the cams 331, 331ª, as to actuate the cam fingers 340 to said effective position before the stop pins 328, 328ª, come into engagement with said cam fingers 340, as seen in Fig. 23.

In order to restore the cam fingers 340 and their associated slides 323, 323ª, to their normal position after said slides have been moved out of mesh with their respective gears, the cam 344 is provided with an abrupt drop 348 so placed thereon relative to the position of the cams 331, 331ª as to cause the pin 343 to drop from the high portion 346 to the low portion 345 of said cam 344 at the end of the rotation of the shaft 321, at which time the pins 327 will be forced into mesh with their associated gear wheels 320 and the pins 79 will be forced into engagement with their associated notches 80 of the cams 331ª by the return of the slides 323 and 323ª to their normal positions under the influence of their springs 330 (Figs. 16 and 17).

After the machine has been actuated by the reciprocation of the general operator handle 210 to register on the totalizer the product of the multiplicand by the number in units denomination of the multiplier, it is necessary to set the machine to multiply the multiplicand by the number in tens denomination of the multiplier when the latter is of more than one denomination. For this purpose, the denominational slide 116 and extension 117 thereof, are adapted to be moved by an escapement mechanism from the position in which it co-acts with the multiplier stepped plate 206 of units denomination into coöperative position with the stepped plate 206 of tens denomination, prior to the rearward stroke of the handle 210 when computation is taking place in tens denomination of the multiplier.

To guide the denominational slide 116 in its angular motion about the rod 100 so that its extension 117 may engage the stepped plate 206 of units denomination of the multiplier, said slide is provided with an extension 118 (Figs. 1, 2 and 8), the lower end of which is normally engaged by a groove 194 formed in a guide plate 193, said groove being so formed in the plate 193 as to lie in an arc in which the lower end of the extension 118 moves about the rod 100, and to lie in the plane of the stepped plate 206 of units denomination, and is of such an extent as to engage said lower end of the extension 118 through its maximum arcuate motion corresponding to the value of "9" in the multiplier.

In order to move the extension 117 of the denominational slide 116 into engaging relation with the stepped plate 206 of tens denomination of the multiplier at the end of the return (forward) stroke of the general operator handle 210 in a computation in units denomination of the multiplier, the cam 188 has formed thereon a high portion 246 (Fig. 3) adapted to rock the arm 187, rock shaft 186 and arm 185 in counter-clockwise direction, as seen in Fig. 3, or in clockwise direction, as seen in Fig. 1, a distance rearwardly beyond their normal position, as seen in Figs. 1 and 3. During this additional clockwise rocking of the arm 185, as seen in Fig. 1, the arm 112 and associated parts will be rocked in counter-clockwise direction and therewith the lower end of the extension 118 toward the rear of its normal position, at which time said extension will pass into a groove 195 (Figs. 1, 2 and 8) so placed in the guide plate 193 as to move the denominational slide 116 longitudinally of its axis 100 during the rearward, arcuate motion from normal position of said slide, a distance equivalent to the distance between the stepped plate 206 of units denomination and the stepped plate 206 of tens denomination, said extension 118 at the completion of said rearward, arcuate motion of the slide 116 passing into a groove 194ª in the guide plate 193, similar to the groove 194, but in the plane of the stepped plate 206 of tens denomination. When the cam 188 has moved so that the associated roller 66 on the arm 187 has moved from the high portion 246 of said cam to its normal (Fig. 3) position at the end of the forward stroke of the general operator handle 210, the slide 116 will be swung about its axis 100 from its rearmost position to its normal (Fig. 1) position along the groove 194ª ready to engage the stepped plate 206 of tens denomination.

After the slide 116 has been positioned to compute in tens denomination of the multiplier, the annular racks 153 on the cylindrical drum 104 will be rotated at the reciprocation of the general operator handle 210 extents proportional to the partial products corresponding to the multiplication of the digits of the multiplicand by the digit corresponding to the depressed numeral key 201 in tens denomination of the multiplier, the extents of rotation of the racks 153 corresponding to said partial products regardless of the denominational order of the multiplier digit; but the value of said partial products as represented by the extents of rotation of the annular racks 153 when actuated in tens denomination, should be ten times greater in digital value than the digital value of the corresponding products represented by the extents of rotation of the annular racks 153 when actuated in units denomination of the multiplier. In order to increase the partial products corresponding to tens denomination of the multiplier, when registering them on the totalizer, to ten times their digital value, the totalizer is adapted to be moved thereon so that the dial wheel of tens denomination thereon will be moved into coöperative position with the annular racks 153 of units order on the cylindrical drum 104, the other dial wheels of the totalizer being likewise shifted one place with respect to the orders of the annular racks on the drum.

In order to move the totalizer carriage B step by step denominationally so as to shift the dial wheels 307 one order to the right (as viewed from the front of the machine) after effecting a computation corresponding to one order of the multiplier and before effecting the computation corresponding to the next higher order, there is provided an escapement mechanism (Fig. 7), which at the end of each return stroke of said general operator handle 210, is actuated to permit the totalizer carriage to move one step toward the right side of the machine (Fig. 2) under the influence of a spring barrel 250 (Fig. 1) mounted in the framework A of the machine and connected to the carriage B of the totalizer by a band 251, one end of which is fastened to the periphery of the spring barrel, and the other end of which is fastened to a pin 252 fast on the framework B of the totalizer carriage.

The escapement mechanism for the totalizer carriage comprises an arm 236 rotatably mounted on the rock shaft 186 (Figs. 1, 2 and 7), said arm having an escapement pawl 249 pivoted thereto. A stop shoulder 247, on said pawl 249, is drawn into engagement with the side of the arm 236 by a spring 248, so as to hold said pawl against motion in clockwise direction about its pivot, as seen in Figs. 2 and 7, thus forming a positive stop for the totalizer carriage B when said pawl is in engagement with a rack 239 carried by said carriage. The teeth of said rack 239 are spaced at distances from each other corresponding to the distances between the dial wheels 307 which likewise correspond with the distances between the annular racks 153. The pawl 249 is held in engagement with the rack 239 by a spring 237 (Fig. 1), one end of which is fast to the framework A of the machine, and the other end of which is fast to an extension of the arm 236, so as to tend to rock said arm in counterclockwise direction, as seen in Fig. 1, said arm being provided with an extension 253 at its outer end to engage the side of the rack 239, to limit the counterclockwise motion of the arm 236, so that the pawl 249 thereon will remain in engagement with the rack 239 during the rotation of the shaft 186 and connected parts in a counterclockwise direction relative to their normal position.

It is advantageous to move the totalizer carriage B denominationally simultaneously with the denominational motion of the multiplier slide 116. For this purpose the arm 185 has an extension 238 formed thereon (Figs. 1, 2 and 7) which overlies the arm 236 of the totalizer escapement mechanism so as to rock said arm in clockwise direction, as seen in Fig. 1. At the end of the return stroke of the general operator handle 210 when the high portion 246 of the cam 188 (Fig. 3) is in engagement with the roller of the arm 187, which is fast to the rock shaft 186, the rock shaft and connected parts will be swung in clockwise direction from normal position, as seen in Fig. 1, at which time, a pawl 254 also pivoted on the arm 236, will be moved into the path of the totalizer rack 239. The pawl 254 is provided with a stop surface 255, which is normally drawn into engagement with a stop pin 256 (Fig. 7) by a spring 257, so that its upper end will normally lie in a position such that it will engage the tooth of the rack 239 corresponding to the next higher denomination than the one in engagement with the pawl 249. When the arm 236 is swung in clockwise direction, the pawl 249 will be moved out of engagement with the rack 239 and the pawl 254 will be moved into the path of the teeth of said rack, which will now be free to move under the influence of its spring barrel 250 until the tooth of the rack 239 of said next higher denomination will come into engagement with the upper end of the pawl 254 to swing said pawl in clockwise direction about its pivot, as seen in Figs. 2 and 7, against the tension of its spring 257 until a stop surface 258 (Fig. 7) is brought into engagement with the stop pin 256 to arrest the rotation of the pawl 254 and the motion of the carriage B along the rod 300, at a point at which said tooth of next higher denomination will stand in engaging relation with the pawl 249. When the arm 236 is swung back to its normal position at the completion of the return stroke of the general operator handle 210, the pawl 254 will be moved out of engagement with the rack 239 and the pawl 249 will be moved into engagement with said tooth of next higher denomination on the rack, so as to hold said rack and totalizer carriage B against further denominational motion until the completion of the next computation; the pawl 254 being free of the rack 239 will be moved back to its normal position by its spring 257, said pawls being so spaced from each other relative to the width of the teeth of the rack 239, that said rack will always be in control of the escapement mechanism.

After the general operator handle 210 has been reciprocated a number of times equivalent to the number of denominations in the multiplier, at which time the complete product of the multiplicand appears at the sight-opening 77 of the totalizer, it is advantageous to return the numeral keys of the keyboards 51, 52 and connected parts, to normal position, and the denominational multiplier slide 116 and totalizer carriage B to their units positions, so that multiplication may be again performed on the machine. For this purpose the general operator handle 210 is adapted to be moved forwardly of its normal position, that is, in a counterclockwise direction (Fig. 1), and is so connected to the mechanism of the machine as to restore said parts, with the exception of the totalizer carriage B, to said normal and units positions, the totalizer carriage B being restored to its units position by hand, as will presently be described.

In order to restore to normal position the numeral key levers 160, 200 and their associated parts, and also the numeral keys 161, 201, there is fast to the general operator rock shaft 211 an upright arm 208ª (Figs. 1 and 2), the upper end of which is in engagement with the depending arm of a bell-crank 209ª pivoted on the framework A of the machine, and having a pin-and-slot connection with a vertical slide bar 209 (Figs. 1 and 12), provided with cams 259, 260, which are normally out of engagement with cross slides 209ᵇ and 209ᶜ each provided with cams 261 (Figs. 2 and 12). Said cams 261 are normally ineffective on pins 262 fast on the spring-pressed numeral key holding bars 172, 204. The cross slides 209ᵇ and 209ᶜ are provided with extensions 263 extending into the path of the cams 259 and 260 on the bar 209.

In order to permit the general operator handle 210 to move forwardly of its normal (Fig. 1) position, said handle is provided with a latch handle 264 pivoted on the handle 210 and connected to a depending link 233 (see Fig. 13), the lower end of which has a latch 233ª guided in a slot 265 in the handle 210, said latch normally standing in the path of a projection 266 on the framework A of the machine, which serves as a stop for the general operator handle 210 at the end of its return (forward) stroke to normal position. To move the handle 210 forwardly of its normal position, the free end of the latch handle 264 is pressed downwardly to raise the link 233 and latch 233ª above and out of the path of projection 266. At this time the handle 210 may be moved forwardly of its normal position until arrested by the engagement of the latch 233ª on a stop surface 267 on the framework A of the machine, during which time the arm 208ª fast on the general operator rock shaft 211 is rocked in counterclockwise direction, as seen in Fig. 1, to swing the bell-crank 209ª in clockwise direction against the tension of its spring 268, to move the slide 209 and the cams 259, 260, thereon, upwardly, so that they will engage the extensions 263 formed on the cross slides 209ᵇ, 209ᶜ, to move said slides toward the right side of the machine, at which time the cam surfaces 261 thereon will engage the pins 262 fast on the numeral key locking bars 172, 204, to slide said bars rearwardly against the tension of their springs, so that the forward ends of said bars will be moved out of engagement with the teeth formed on the pendents 170 and 203 of the numeral key levers 160 and 200, respectively, to release said numeral key levers, so that they may be returned to their normal position by their springs 269. When the numeral key levers are restored to their normal position, the projections 164, 54, of the numeral keys 161, 201, will be moved out of engagement with the stops 166, 55, respectively, at which time said numeral keys will be returned to their normal position by the power of their springs.

During the return of the handle 210 from its forward of normal to its normal position, the arm 208ª (Fig. 1) will be swung in clockwise direction away from the bell-crank 209ª, which, by the power of its spring 268, will be returned to its normal position and therewith the slide 209 and cams 259, 260, thereon, at which time the stop bars 172, 204, will be free to return to their normal position by the power of their springs, the pins 262 thereon acting on the cam surfaces 261 of the cross slides 209ᵇ, 209ᶜ, to move said slides to their normal ineffective positions. The projection 266 (Fig. 13) is provided with a cam surface 270, in passing over which the latch 233ᵃ will be raised until the handle 210 has reached its normal position, at which time said latch will drop into the path of the projection 266, to prevent further forward of normal motion of said handle 210 until the latch handle 264 is again operated.

To restore the denominational slide 116 to its units position, the escapement guide plate 193 is adapted to be moved downwardly out of engagement with the extension 118 of said slide during the forward of normal motion of the handle 210, at which time the slide 116 is moved longitudinally of the axis 100 along the slideway 114 until its forward extension 117 is moved into engaging relation with the multiplier stepped plate 206 of units denomination.

To permit the guide plate 193 to be swung downwardly, said guide plate is carried at the forward end of an arm 190 (Figs. 1 and 2), pivoted at 191 and its hub is provided with a downwardly projecting arm 271, the lower end of which is in engagement with the rear end of a rod 217 slidingly mounted in the framework A of the machine. The forward end of said rod 217 stands in the path of an arm 216 fast on the general operator rock shaft 211, and is engaged by said arm 216 during the forward of normal motion of the general operator handle 210, at which time said rod will be moved rearwardly to swing the bell-crank 271, 190, in counterclockwise direction, as seen in Fig. 1, against the tension of its spring 272 and therewith the guide plate 193, so that the grooves thereon will be moved out of engagement with the extension 118 of the denominational slide 116. The denominational slide 116 is in engagement with an arm 120, fast to the upper end of an upright rock shaft 121, journaled to the framework A of the machine, and has one end of a spring 273 connected thereto, the other end of which is fast to the framework A (Figs. 1 and 2), said spring being so tensioned as to swing the arm 120 in counterclockwise direction, as seen in Fig. 2, so as to move the slide 116 along its slideway 114, to bring the projection 117 carried by said slide into engaging relation with the stepped plate 206 of units denomination on the multiplier keyboard 52, beyond which point the slide 116 is arrested against further motion by a stop 274. When the guide plate 193 is moved downwardly out of engagement with the extension 118 of the slide 116, at the actuation of the general operator, said slide will be free to move under the influence of the arm 120 and its spring 273 to restore the slide 116 to its units position, ready for the next multiplication.

After the slide 116 has been returned to said units position, the guide plate 193 will be restored to its normal position, so that the groove 194 thereon will engage the lower end of the extension 118 of the slide 116, so that said extension 118 may be moved into the groove 194ᵃ at the next reciprocation of the general operator handle 210, to compute in tens place of the multiplier, and so on into a groove 194ᵇ and 194ᶜ, at the next two subsequent reciprocations of the general operator handle 210, so as to compute in hundreds denomination and thousands denomination, respectively, of the multiplier.

In order to insure that the lower end of the projection 118 will be moved from the groove 194 into the groove 194ᵃ, and so on, there is provided cam projections or gates 196 and 197, which permit the projection 118 to move past said gates in a direction from lower to higher denomination only. For this purpose, said gates are formed so as to present cam faces to the projection 118 in its passage over them from lower to higher denomination, and to present definite stop surfaces against the passage of the projection 118 against its tendency of motion from higher to lower denomination through the grooves 194ᶜ to 194, inclusive, so that said extension may only pass from higher to lower denomination at the depression of the guide plate 193 to ineffective position.

In order to guide the extension 118 from any of the grooves 194, 194ᵃ, 194ᵇ to the groove of next higher denomination, through one of the grooves 195, the gate 197 is so placed relative to the junction of said groove, with its connected groove 195 (Fig. 8), that said projection, when moved rearwardly of its normal position, will not move rearwardly along the groove of the denomination in which a computation has just been completed, but will be forced by the stop surface of the gate 197, to enter and move along the groove 195 until it has reached the gate 196, placed at the end of said groove 195, said gate being so placed at the end of said groove as to present a cam surface to the extension 118. Said extension in its passage through the end of said groove into the groove of next higher denomination will cam down the gate 196 against the tension of its spring 275 (Figs. 1 and 9), until the extension 118 has passed into the rear end of the groove of next higher denomination, at which time the spring 275 will restore the gate 196 to its normal position, in which it will present a stop surface to the extension 118, to prevent the passage of said extension into the groove 195, through which it has passed. At the forward motion of the extension 118 from the rear end of a groove 194, 194ᵃ, 194ᵇ, the projection 118 will come into engagement with a cam surface of one of the gates 197, to depress said gate against the tension of its spring 275, until the extension 118 has been moved along said groove to its normal position, at which time the gate 197 will be restored to its normal position to present a stop surface to the extension 118, so as to guide said extension along the grooves to next higher denomination at the end of the next computation.

It is advantageous to hold the slide 116 and associated parts against accidental actuation during the return of said slide to its units position. For this purpose, the arm 190, which carries the guide plate 193, also carries a hook 192 (Fig. 1), which is adapted to engage a lug 115 (Figs. 1 and 2), when the guide plate 193 is depressed, so as to hold the slide 116 and associated parts against angular motion around the axis 100, and also the parts mounted on the rock shaft 186 against angular motion during the forward or normal actuation of the general operator handle 210.

It will be noted by reference to Fig. 3 that during the forward of normal actuation of the handle 210, the cam 188 will receive a slight clockwise rotation from its normal position. This rotation, however, will be idle since said cam has a concentric portion 276 formed thereon, which will remain in engagement with the rollers 66 during said idle rotation, thus holding the roller and connected parts in their ineffective normal position, said cam remaining in said idle position during the return of said handle 210 from its forward or normal to its normal position, and during a portion of the next rearward of normal actuation of the handle 210, an extent equal to the extent of forward of normal actuation, the ball clutches 61 and 85 being so arranged as to permit this.

More specifically stated, the engaging elements of the ball clutch 61, between the pinion 62 and the shaft 60, are so placed with respect to said pinion and shaft respectively, that when the parts of the mechanism are in the position shown in Fig. 3, said clutch will be immediately effective on rearward rotation of the general operator handle 210. As previously stated, the ratio of the driving gears is such that a full rearward stroke of the general operator handle 210 will advance the cams 188 and 301ᵇ, which are fast to the gear 64, through an angular distance of 180°, or one-half a revolution, in a clockwise direction, the drive being effected from the segment 212, through the train of gears 59ᵃ, 62, and 63, including the ball clutch 61. During this rotation, the pinion 87 and its shaft 86 will be rotated idly in a counter-clockwise direction, whereas the gear 84 will, through the train of gearing 74, 73, be rotated idly in a clockwise direction. This will be permitted by the ball clutch 85. The engaging elements of said ball clutch 85 are so positioned with respect to the pinion 84 and shaft 86, respectively, that, with the parts of the mechanism in the position to which they are advanced by the rearward rotation of the general operator handle 210, said ball clutch will immediately effect a driving connection at the beginning of the following forward stroke of said general operator handle. This drive upon the return stroke of the general operator handle, as previously described, is effected from the segment 212 to the gear 64, through the train of gears 59ᵃ, 74, 73, 84, and 87, including the ball clutch 85, the driving ratio being such as to impart to the cams 188 and 301ᵇ a further rotation of 180° or one-half a revolution, also in clockwise direction. During this rotation, the pinion 62, through the intermediary of the pinion 63, which is in mesh with the gear 64, will be rotated in clockwise direction, whereas the shaft 60, fast to the pinion 59ᵃ, is at the same time being rotated in counter-clockwise direction. This is permitted, however, by the ball clutch 61. During this return rotation of the general operator handle 210, the parts of the mechanism are brought again to the position shown in Fig. 3. It will now be noted that when the parts of the mechanism stand in the position illustrated in Fig. 3, the elements of the ball clutch 85, which has just been acting as a driver, will remain in position to be immediately effective on further forward (forward of normal) rotation of the general operator handle, whereas the elements of the ball clutch 61 are so positioned as to be immediately effective on rearward rotation of the general operator handle.

If, therefore, at the end of any working reciprocation of the general operator handle 210, to the rear and return, it be given a rotation forward of normal for the purpose of resetting the parts of the mechanism as above described, the ball clutch 85 will be effective during such forward of normal rotation, and will, therefore, cause the cam 188 to be rotated through a small angle in a clockwise direction. During this rotation, the engaging elements of the ball clutch 61 will be separated, for the reason that the pinion 62, during said forward of normal rotation of the general operator handle 210, will be rotated through a small angle in a clockwise direction through the intermediary of the gear 63, meshing with the gear 64, while the shaft 60, connected with the pinion 59ᵃ, will at the same time be given a slight rotation in a counter-clockwise direction. On the rearward to normal rotation of the general operator handle 210, the ball clutch 85 will be ineffective because of the direction of rotation, and the shaft 62 will be brought back idly to its normal position. In view, however, of the slight clockwise rotation of the pinion 62, during the forward of normal rotation of the general operator handle, the engaging elements of the ball clutch 61 will still be slightly separated, and will not become effective until a further rearward rotation of the handle 210 equal to its forward of normal rotation, after which said clutch will be effective, during the remainder of the rearward rotation of the handle 210, to impart to the cams 188 and 301ᵇ the remainder of their rotation of 180°.

It will now be apparent that the cams 188 and 301ᵇ will be given one complete rotation either by a working reciprocation of the handle 210 to the rear and return, or by a forward of normal resetting reciprocation followed by such rearward working reciprocation. This is essential, since, in the operation of the machine during the multiplication of a multiplicand by a multiplier of two or more arithmetical orders, it will be necessary to impart to the handle 210 a plurality of working reciprocations to the rear and return followed by a single forward of normal resetting reciprocation. The device above described provides for this forward of normal resetting reciprocation without throwing the parts of the mechanism out of adjustment on a subsequent working stroke.

The cam 240ᵃ will also receive a slight rotation (counter-clockwise as seen in Fig. 3) during the forward of normal actuation of the handle 210, but this will also be an idle rotation, since the cam surface is concentric for a short distance from the normal point of contact of the roller 96. This idle rotation will merely initiate a part of the rotation of 360° which will be completed on the subsequent working stroke of the general operator segment 212.

For the purpose of restoring the multiplicand index pins 139 to their normal positions simultaneously with the restoring of the slide 116 to its units position, there is fast to the gear 73 a cam 277 (Fig. 3), which is adapted to swing the arm 178, fast on the shaft 158, against the tension of a spring 278, in counterclockwise direction, to swing an arm 155 and a resetting bar 176, fast thereon, in counter-clockwise direction, to the position shown in Fig. 3ᵃ, said resetting bar extending across all of the index pins 139, and adapted to strike the heads 140 of all said index pins which may have been raised from their normal positions, and to reset them in readiness for the next multiplicand indexing operation. During the rearward to normal actuation of the handle 210, the direction of rotation of the gearing will be reversed to move the cam 277 back to normal position, and therewith the resetting bar 176, which will be moved out of the path of radial motion by the multiplicand index pins 139 which may then be again set by depressing their corresponding multiplicand numeral keys 161.

In order to hold the annular racks 153 and pawls 143, associated with said index pins, against accidental rotation during the forward of normal actuation of the handle 210, the cam 71, which is also fast to the gear wheel 73, is provided with a concentric portion, adapted to engage the roller 70 (Fig. 3), connected through the intermediary of the arm 154ᵇ with the universal locking bar 153ᵃ, to hold said bar in its normal effective position during said forward of normal and rearward to normal actuation of the handle 210.

To return the totalizer carriage B to its units position, said carriage is moved by hand against the tension of its spring barrel 250, the rack 239 thereon swinging the pawl 249, in engagement therewith, about its pivot against the tension of the spring 248 until said carriage has reached its units position, in which the pawl 249 will engage the corresponding tooth of the rack 239, to hold said carriage in its units position against the tension of the spring barrel 250.

It may be noted in passing that the parts of the machine will be returned to their normal positions by the above described auxiliary reciprocation of the general operator handle 210 forward of its normal position, after the entire product has been registered on the totalizer, regardless of the number of denominations in the multiplier, that is to say the extension 118 of the denominational multiplier slide 116 does not have to be moved from the groove 194, step by step, into the groove 194ᶜ before the parts may be returned to normal, but may be returned to normal from any groove in which it may be at the end of a multiplication.

For the purpose of returning the dial wheels 307 to zero at the end of every multiplication, or at any other time, in case it is not desired to accumulate the value of the products of successive multiplications performed upon the machine, each gear wheel 304 of the totalizer is provided with pins 279 adapted to be engaged by a projecting finger 280 (Figs. 17 and 18), there being one such finger 280 for each gear wheel 304. The fingers 280 are mounted on the shaft 76 and pass through slots in spacer sleeves 315, mounted on said shaft between the wheels 304 of the totalizer, said fingers 280 normally standing out of engagement with the pins 279, as seen in Fig. 18. The shaft 76 is provided at one end with a knurled head 281 by which it may be turned, and at the other end with a pin 282, which, on manual rotation of said shaft by the head 281, is adapted to engage eight cam surfaces 283, the initial one having a square stop shoulder 282ª. Said cam surfaces 283 are carried by a part of the framework of the totalizer B, and are equally spaced from each other. They are so shaped as to coöperate with said pin 282 to draw the shaft 76 longitudinally, and cause it to move the fingers 280 thereon into the path of the pins 279 on the gears 304. On further rotation of the shaft 76, the fingers 280 will engage the pins 279 to rotate the gear wheels 304 therewith until the pin 282 drops to the bottom of the next cam 283, at which time the shaft 76 will be moved longitudinally by a spring 284, which normally urges the knurled head 281 away from the frame B, so that the fingers 280 on said shaft will be moved out of engagement with the pins 279, and impart no further rotation to the associated gear wheels 304 and dial wheels 307. The cams 283 are so placed relatively to the numerals on the dial wheels 307 that the numeral "0" thereon will appear at the sight-opening 77, when the gear wheels 304 become disengaged from the respective fingers 280, the spring 284, (Fig. 18), serving to hold the fingers 280 out of engagement with the projections 279 on their respective gear wheels 304, and to hold the pin 282 against the face of the cams 283.

When it is desired to use the machine for addition, the "1" numeral key in units place of the multiplier keyboard 52 is held in its depressed position, while the numeral keys of the keyboard 51 are used to index the numbers to be added, the general operator handle 210 being reciprocated its full extent backward and forward, and to its normal position after each number to be added has been indexed, the totalizer carriage B being moved to its units position after each reciprocation of the handle 210.

For the purpose of holding the multiplicand index pins 139 against radial displacement, except when said pins are in their normal position, in engagement with the forks 168 on the multiplicand numeral key levers, each index pin 139 is provided with annular shoulders 141 (Figs. 1 and 6) adapted to engage and ride in contact with the cylindrical drum 104, one above and one below its cylindrical wall, the grooves 135 of said drum being only of sufficient width to receive the index pins 139 at their smallest diameter between two of said shoulders. To permit radial movement of said pins when in their normal position, each of said grooves is provided with an enlarged portion 285 (Fig. 11), said portion being of sufficient size to allow the shoulders 141 of said pins to pass therethrough in an indexing operation. During the initial rotation of the drum 104, the narrow portion of the slots 135 will move into engagement with the index pins 139, so as to engage each pin between two of its shoulders 141, to positively hold said pins against radial motion, the slides 136 having grooves 286 cut therein to permit the grooves 135 to engage the shoulders 141 of said index pins.

Variations may be resorted to within the scope of the invention, and portions of the improvements may be used without others.

Having thus described my invention, I claim:

1. In a multiplying machine, the combination with indexing mechanism which may be set to represent the digits of a multiplicand, and indexing mechanism which may be set to represent a digit of a multiplier, of a set of product gages each representing a digit and the nine multiples thereof, and means dependent on relative movement between said indexing mechanism and said gages in accordance with the setting of said indexing mechanism, for indicating a product of a multiplicand comprising a plurality of digital orders, multiplied by said multiplier digit, on a single operation of said parts.

2. In a multiplying machine, the combination with indexing mechanism which may be set to represent the digits of a multiplicand, and indexing mechanism which may be set to represent the digits of a multiplier, of a set of product gages each representing a digit and the nine multiples thereof, means dependent on relative movement between said indexing mechanism and said gages in accordance with the setting of said indexing mechanism, for indicating the partial product of a multiplicand comprising a plurality of digital orders, multiplied by one of said multiplier digits, on a single operation of said parts, and means for successively accumulating therewith and indicating the sum of partial products corresponding to the same multiplicand, multiplied by other digits of said multiplier, by a number of succeeding operations of said parts equal to the number of said other multiplier digits, thus effecting the indication of the product of said multiplicand by said multiplier by a number of operations equal to the number of denominational orders of said multiplier.

3. In a multiplying machine, the combination with a set of movably-mounted product gages, one for each of the digits "1" to "9", each gage being provided with a stop-determining element having a position with respect thereto indicative of the digit it represents, each gage being also provided with a set of stop-determining elements, the stop-determining elements of each set having relative positions indicative of the multiples of the digit represented by said gage, of indexing mechanism which may be set to represent the digits of a multiplicand, said multiplicand indexing mechanism comprising means to coöperate with the digit stop-determining elements of said gages, to select and render effective, at each computing operation, a gage or combination of gages dependent upon the setting of said multiplicand indexing mechanism, indexing mechanism which may be set to represent a digit of a multiplier, said multiplier indexing mechanism comprising means to coöperate with the multiple stop-determining elements of said gages to limit the movement of selected gages in accordance with the setting of said multiplier indexing mechanism, and means dependent upon such selection and limited movement of said gages for indicating a product of a multiplicand comprising a plurality of denominational orders, as set up on said multiplicand indexing mechanism, multiplied by a digit of a multiplier, as set up on said multiplier indexing mechanism, on a single operation of said parts.

4. In a multiplying machine, the combination with a set of movably-mounted product gages, one for each of the digits "1" to "9", each gage being provided with a stop-determining element having a position with respect thereto indicative of the digit it represents, each gage being also provided with a set of stop-determining elements, the stop-determining elements of each set having relative positions indicative of the multiples of the digit represented by said gage, of indexing mechanism comprising a set of adjustable stop-determining elements, one for each denominational order, which may be set to represent the digits of a multiplicand, each of said adjustable stop-determining elements, when so set to represent a digit, being positioned for coöperation with the digit stop-determining element of the product gage of corresponding digital value, said multiplicand indexing mechanism thus constituting means for selecting and rendering effective, at each computing operation, a gage or combination of gages dependent upon the setting of said multiplicand indexing mechanism, indexing mechanism which may be set to represent a digit of a multiplier, said multiplier indexing mechanism comprising means to coöperate with the multiple stop-determining elements of said gages to limit the movement of selected gages in accordance with the setting of said multiplier indexing mechanism, and means dependent upon such selection and limited movement of said gages for indicating a product of a multiplicand comprising a plurality of denominational orders, as set up on said multiplicand indexing mechanism, multiplied by a digit of a multiplier, as set up on said multiplier indexing mechanism, on a single operation of said parts.

5. In a multiplying machine, the combination with a set of movably-mounted product gages, one for each of the digits "1" to "9," each gage being provided with a stop-determining element having a position with respect thereto indicative of the digit it represents, each gage being also provided with a set of stop-determining elements, the stop-determining elements of each set having relative positions indicative of the multiples of the digit represented by said gage, of indexing mechanism which may be set to represent the digits of a multiplicand, said multiplicand indexing mechanism comprising means to coöperate with the digit stop-determining elements of said gages, to select and render effective, at each computing operation, a gage or combination of gages dependent upon the setting of said multiplicand indexing mechanism, indexing mechanism comprising a movable stop plate, which may be set to represent the value of a digit of a multiplier, said plate being provided with stop-determining elements, one for each of the digital values "1" to "9," said stop plate being positioned, when set to represent a digit of one of said digital values, in a position such as to render effective its corresponding stop-determining element, means coöperating with said stop-determining element, when thus rendered effective, and with the multiple stop-determining elements of said gages, to limit the movement of selected gages in accordance with the setting of said multiplier indexing mechanism, and means dependent upon such selection and limited movement of said gages for indicating a product of a multiplicand comprising a plurality of denominational orders, as set up on said multiplicand indexing mechanism, multiplied by a digit of a multiplier, as set up on said multiplier indexing mechanism, on a single operation of said parts.

6. In a multiplying machine, the combination with a set of movably-mounted product gages, one for each of the digits "1" to "9," each gage being provided with a stop-determining element having a position with respect thereto indicative of the digit it represents, each gage being also provided with a set of stop-determining elements, the stop-determining elements of each set having relative positions indicative of the multiples of the digit represented by said gage, of indexing mechanism which may be set to represent the digits of a multiplicand, said multiplicand indexing mechanism comprising means to coöperate with the digit stop-determining elements of said gages, to select and render effective, at each computing operation, a gage or combination of gages dependent upon the setting of said multiplicand indexing mechanism, indexing mechanism which may be set to represent a digit of a multiplier, said multiplier indexing mechanism comprising means to coöperate with the multiple stop-determining elements of said gages to limit the movement of selected gages in accordance with the setting of said multiplier indexing mechanism, an indicating mechanism, means active during one period of an operation of said machine, for effecting such selection and limited movement of said gages while said indicating mechanism remains passive, and means active during a subsequent period of the same operation and dependent upon said prior selection and extent of movement of said gages, for restoring said gages to their normal positions while registering on said indicating mechanism a product of a multiplicand comprising a plurality of denominational orders, as set up on said multiplicand indexing mechanism, multiplied by a digit of a multiplier, as set up on said multiplier indexing mechanism.

7. In a multiplying machine, the combination with a set of movably-mounted product gages, one for each of the digits "1" to "9," each gage being provided with a stop-determining element having a position with respect thereto indicative of the digit it represents, each gage being also provided with a set of stop-determining elements, the stop-determining elements of each set having relative positions indicative of the multiples of the digit represented by said gage, of indexing mechanism which may be set to represent the digits of a multiplicand, said multiplicand indexing mechanism comprising means to coöperate with the digit stop-determining elements of said gages, to select and render effective, at each computing operation, a gage or combination of gages dependent upon the setting of said multiplicand indexing mechanism, indexing mechanism which may be set to represent the digits of a multiplier, said multiplier indexing mechanism comprising means to coöperate with the multiple stop-determining elements of said gages, at each computing operation of said machine, to limit the movement of selected gages in accordance with the numerical value of one of the digits of a multiplier as set up on said multiplier indexing mechanism, denomination-controlling means including a guide, effective during each such operation, to so readjust parts of said gage movement-limiting means, that on a subsequent operation the movement of said gages will be limited in accordance with the numerical value of a digit of said multiplier of a different denominational order, as set up on said multiplier indexing mechanism, and means dependent upon such selection and limited movement of said gages, at each operation of said machine, for indicating the product of a multiplicand, as set up on said multiplicand indexing mechanism, multiplied by a multiplier as set up on said multiplier indexing mechanism.

8. In a multiplying machine, the combination with a set of movably-mounted product gages, one for each of the digits "1" to "9," each gage being provided with a stop-determining element having a position with respect thereto indicative of the digit it represents, each gage being also provided with a set of stop-determining elements, the stop-determining elements of each set having relative positions indicative of the multiples of the digit represented by said gage, of multiplicand indexing mechanism including a set of adjustable stop-determining elements, one for each denomination, which may be set to represent the digits of a multiplicand, said adjustable stop-determining elements being moved, when thus set, into positions for selective engagement with the digit stop-determining elements of said product gages, to select and render effective, at each computing operation, a gage or combination of gages dependent upon the setting of said multiplicand indexing mechanism, indexing mechanism which may be set to represent a digit of a multiplier, said multiplier indexing mechanism, comprising means to coöperate with the multiple stop-determining elements of said gages to limit the movement of selected gages in accordance with the setting of said multiplier indexing mechanism, an indicating device, a series of driving members therefor, one for each denominational order of said multiplicand indexing mechanism, means for imparting to each adjustable stop-determining element of said multiplicand indexing mechanism, a movement corresponding in extent to the movement of the gage with which it is in coöperative relation, and means for transmitting to said indicator-driving members, movements corresponding in extent to the movements of the corresponding adjustable stop-determining element, as determined by said selection and limited movements of said product gages.

9. In a multiplying machine, the combination with a set of movably-mounted product gages, one for each of the digits "1" to "9," each gage being provided with a stop-determining element having a position with respect thereto indicative of the digit it represents, each gage being also provided with a set of stop-determining elements, the stop-determining elements of each set having relative positions indicative of the multiples of the digit represented by said gage, of multiplicand indexing mechanism including a set of adjustable stop-determining elements, one for each denomination, which may be set to represent the digits of a multiplicand, said adjustable stop-determining elements being moved, when thus set, into positions for selective engagement with the digit stop-determining elements of said product gages, to select and render effective, at each computing operation, a gage or combination of gages dependent upon the setting of said multiplicand indexing mechanism, indexing mechanism which may be set to represent a digit of a multiplier, said multiplier indexing mechanism comprising means to coöperate with the multiple stop-determining elements of said gages to limit the movement of selected gages in accordance with the setting of said multiplier indexing mechanism, an indicating device, a series of driving members therefor, one for each denominational order of said multiplicand indexing mechanism, means for imparting to each adjustable stop-determining element of said multiplicand indexing mechanism, during one part of a computing operation of said machine, a movement corresponding in extent to the movement of the gage with which it is in coöperative relation, during which said indicator-driving members remain passive, and means effective during a subsequent part of the same computing operation for returning said product gages and adjustable stop-determining elements to their normal positions, at the same time imparting to said indicator-driving members, movements corresponding in extent to the movements of the corresponding adjustable stop-determining elements, as previously determined by said selection and limited movements of said product gages.

10. In a multiplying machine, the combination with a set of movably-mounted product gages, one for each of the digits " 1 " to " 9," each gage being provided with a stop-determining element having a position with respect thereto indicative of the digit it represents, each gage being also provided with a set of stop-determining elements, the stop-determining elements of each set having relative positions indicative of the multiples of the digit represented by said gage, of indexing mechanism which may be set to represent the digits of a multiplicand, said multiplicand indexing mechanism comprising means to coöperate with the digit stop-determining elements of said gages, to select and render effective, at each computing operation, a gage or combination of gages dependent upon the setting of said multiplicand indexing mechanism, indexing mechanism which may be set to represent the digits of a multiplier, said multiplier indexing mechanism comprising means to coöperate with the multiple stop-determining elements of said gages at each computing operation of said machine, to limit the movement of selected gages in accordance with the numerical value of one of the digits of a multiplier as set up on said multiplier indexing mechanism, denomination-controlling means including a guide, effective during each such operation, to so readjust parts of said gage movement-limiting means, that on a subsequent operation the movement of said gages will be limited in accordance with the numerical value of a digit of said multiplier of a different denominational order, as set up on said multiplier indexing mechanism, a series of totalizer driving members, one for each denominational order of said multiplicand indexing mechanism, a totalizer having number wheels to be driven from said driving members and carry-over mechanism therefor for imparting to each number wheel a rotation corresponding to one digit each time a number wheel of next lower denominational order passes from " 9 " to " 0," means for imparting to said driving members and thence to number wheels of said totalizer at each computing operation, movements dependent upon the selection and limited movement of said gages, said movements corresponding in extent to the partial products which would result from the separate multiplications of the digits of a multiplicand as set up on said multiplicand indexing mechanism, by a digit of said multiplier, as set up on said multiplier indexing mechanism, and means for so adjusting the position of said totalizer for each computing operation that the units driving member will be brought into coöperative driving relation with the number wheel of the totalizer of denominational order corresponding with the denominational order of that part of the multiplier indexing mechanism which determines the extent of movement of the totalizer driving members for that operation, the relative position of other number wheels and driving members being correspondingly shifted, so that the partial products corresponding to the multiplication of a multiplicand, as set up in the multiplicand indexing mechanism, by the digits of a multiplier, as set up in the multiplier indexing mechanism, may be registered and accumulated in the totalizer to indicate the product, by a number of operations of said machine corresponding to the number of digits in the multiplier.

11. In a computing machine, the combination with computing mechanism comprising a series of product gages, each differentiated from each of the others, of means including multiplicand indexing mechanism for selecting one or more gages at each operation of said machine to effect a computation, each of said gages being capable of being selected by indexing mechanism representative of each of a plurality of denominational orders, and means including multiplier indexing mechanism to limit at each operation the extent of movement of selected gages.

12. In a computing machine, the combination with computing mechanism comprising a series of product gages, each differentiated from each of the others, of means including multiplicand indexing mechanism for selecting one or more gages at each operation of said machine to effect a computation, each of said gages being capable of being selected by indexing mechanism representative of each of a plurality of denominational orders, means including multiplier indexing mechanism to limit, at each operation, the extent of movement of selected gages, and denominational-controlling means for causing said gages, on successive operations, to be limited in their movements in accordance with the setting of parts of said multiplier indexing mechanism corresponding to different denominational orders.

13. In a computing machine, the combination with computing mechanism comprising a series of differentiated product gages, of means including multiplicand indexing mechanism for selecting one or more gages at each operation of said machine to effect a computation, multiplier indexing mechanism, a multiplier stop bar, means for setting said stop bar in different positions corresponding with the digits of a multiplier as set up in said multiplier indexing mechanism, and means for moving selected product gages, through the medium of parts of said multiplicand indexing mechanism, into engagement with said multiplier stop bar.

14. In a computing machine, the combination with multiplying devices comprising a series of differently-stepped members, each differentiated from each of the others, of multiplicand setting mechanism, multiplier setting mechanism, and means for selecting and moving combinations of said stepped members at each computing operation, each of said stepped members being capable of being selected and controlled in its movements by indexing mechanism representative of each of a plurality of denominational orders, said selection and extent of movement being dependent upon the setting of said multiplicand and multiplier indexing mechanism.

15. In a computing machine, the combination with multiplying mechanism for determining the products of numbers, and a totalizer into which the sum of the products may be carried, of means including a general operator for carrying into said totalizer the products as determined by said multiplying mechanism, means for operating parts of said totalizer digital amounts and for accumulating carried amounts during one portion of the movement of the general operator, and means for operating parts of said totalizer additional amounts equal to the accumulated carried amounts at another portion of the operation of said general operator.

16. In a computing machine, computation-determining mechanism comprising a rotatable member, a series of digit-determining members carried by said rotatable member and settable radially thereon to positions corresponding with the digits of a number, and means coöperating with said digit-determining members on movement of said rotatable member to effect computation.

17. In a computing machine, the combination with multiplying devices comprising a set of stepped oscillatory members, one member for each digit from "1" to "9", of means for engaging and moving each member and for limiting its movement to distances corresponding to the product of the digit which it represents multiplied by any of the numbers "1" to "9".

18. In a computing machine, the combination with multiplying devices comprising a set of oscillatory plates, said plates having radial projections differently positioned to act as differentiated driving surfaces, and also having radial projections differently positioned to act as differentiated stopping surfaces, of means for engaging said driving surfaces to drive said plates, and means for engaging said stopping surfaces to stop said plates in positions corresponding to the product of two digits.

19. In a computing machine, the combination of multiplying mechanism comprising a series of denominational members, a series of oscillatory stepped members, said last-mentioned series being common to all the denominational members, means for limiting the movement of said stepped members to distances proportional to the product of two digits, and means for transmitting the movement of said stepped members to any of said denominational members.

20. In a multiplication machine, the combination with adjustable means which may be set to represent all of the digits of a multiplicand, and adjustable means which may be set to represent all the digits of a multiplier, of a plurality of product gages each adapted to coöperate with both said means to effect a computation, and each representing a digit and the nine multiples thereof, said multiplicand digit-representing means including parts movable in one direction into coöperative relation with any of the product gages and movable in another direction with said gages.

21. In a computing machine comprising a set of totalizer-driving members corresponding to different denominational orders, and means for moving a plurality of said driving members at a single operation of the machine extents corresponding, respectively, with the partial products which would result from the several multiplications of the digits of a multiplicand by a digit of a multiplier, the combination with said totalizer-driving members, of a series of number wheels to be rotated thereby angular distances corresponding with their movements at each computing operation, a set of carry-over initiating devices, one for each number wheel, each of said initiating devices being set by each rotation of its number wheel to initiate a carry-over corresponding to a number of digits equal to the number of times its number wheel is rotated from "9" to "0", supplemental driving means to impart to said number wheels carry-over completing rotations, and means associated with each number wheel above that of units order for limiting its carry-over completing rotation to an extent determined by the carry-over initiating device of the number wheel of next lower order.

22. In a computing machine comprising a set of totalizer-driving members corresponding to different denominational orders, and means for moving a plurality of said driving members at a single operation of the machine extents corresponding, respectively, with the partial products which would result from the several multiplications of the digits of a multiplicand by a digit of a multiplier, the combination with said totalizer-driving members, of a series of number wheels to be rotated thereby angular distances corresponding with their movements at each computing operation, a set of carry-over initiating devices, one for each number wheel, each of said initiating devices being set by each rotation of its number wheel to initiate a carry-over corresponding to a number of digits equal to the number of times its number wheel is rotated from "9" to "0", supplemental driving means, effective at a period of each computing operation of said machine subsequent to the movement of said totalizer-driving members, for imparting to said number wheels carry-over completing rotations, means effective after the driving of said number wheels by said totalizer-driving members for shifting the driving connections for said number wheels from said totalizer-driving members to said supplemental driving means in readiness to receive said carry-over completing rotations, and means associated with each number wheel above that of units order for limiting its carry-over completing rotation to an extent determined by the carry-over initiating device of the number wheel of next lower order.

23. In a computing machine, the combination with a totalizer having rotatably-mounted number-indicating members, each having a carry-over device associated therewith, of means for rotating number-indicating members amounts determinative of a number to be registered in said totalizer, each carry-over device being thereby operated to an extent dependent upon the number of times its associated number-indicating member passes from "9" to "0," thus storing in said carry-over device an amount to be carried of a corresponding digital value, and means for rotating number-indicating members digital amounts proportional to the amounts thus stored in the carry-over device of next lower denominational order.

24. In a computing machine, the combination with computing mechanism, and restoring mechanism therefor, of a general operator movable in two directions from a normal position, means for effecting a driving connection therefrom to said computing mechanism on movement of said general operator in one direction from normal, and means for effecting a driving connection therefrom to said restoring mechanism, on movement of said general operator in the other direction from normal.

25. In a computing machine, the combination with computing mechanism, and restoring mechanism therefor, of a general operator movable in two directions from a normal position, means for effecting a driving connection therefrom to said computing mechanism on movement of said general operator in one direction from normal, and means effective on movement of said general operator in the opposite direction from normal for driving said restoring mechanism from a part of said means for effecting the driving connection to said computing mechanism.

26. In a computing machine, the combination with computing mechanism operative to effect a computation by a plurality of cycles of movement, and restoring mechanism therefor, of a general operator movable in two directions from normal, means for driving said computing mechanism through its plurality of cycles of movement as a result of an equal number of reciprocations of said general operator in one direction from normal, and means effective on a reciprocation of said general operator in the opposite direction from normal, for operating said restoring mechanism from a part of said means for driving said computing mechanism.

27. In a computing machine, the combination with computing mechanism comprising a series of gages differentiated to represent different digital values, and each having a stop-determining element indicative of the digital value which it represents, of indexing mechanism therefor comprising sets of keys, each set representing a different denominational order, and each key of a set representing a digit of different numerical value, and a set of adjustable stop-determining members, one for each denominational order, each of said adjustable stop-determining members being settable by the respective digit keys of corresponding denominational order in position for effective coöperation with the digit stop-determining element of a gage corresponding with the digital value of the key by which it is set.

28. In a computing machine, in combination, a series of variably settable multiplicand indexing elements, individual setting devices therefor, each including individual restraining means to prevent movement of its respective indexing device in a direction other than its setting direction, a carrier for said indexing elements for moving them in a direction other than their setting direction, means for maintaining frictional engagement between said indexing elements and said carrier, a common releasing device for said indexing elements normally restraining set indexing elements from moving with said carrier when released from the holding action of said individual restraining means, and means carried by said carrier for operating said common releasing device to effect a releasing of the set indexing elements.

29. In a multiplying machine, in combination, a variably positionable multiplier stop-bar, a movably mounted operating member therefor, a movement-determining member mounted for transverse movement relatively to said operating member, a series of multiplier indexing members, one for each denominational order, each having surfaces representative of different digits, means for setting said indexing members to represent the digits of a multiplier, and a guide member effective at each operation of the machine for effecting a transverse movement of said movement-determining member from coöperative relation with an indexing member of one denominational order to an indexing member of another denominational order.

BENJAMIN M. DES JARDINS.

Witnesses:
C. NEWELL,
ARTHUR A. JOHNSON.